(12) United States Patent
Hamada

(10) Patent No.: US 8,774,606 B2
(45) Date of Patent: *Jul. 8, 2014

(54) INFORMATION PROCESSING DEVICE, INFORMATION RECORDING MEDIUM, INFORMATION PROCESSING METHOD, AND PROGRAM

(75) Inventor: Toshiya Hamada, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/638,771

(22) PCT Filed: Mar. 28, 2011

(86) PCT No.: PCT/JP2011/057535
§ 371 (c)(1),
(2), (4) Date: Oct. 1, 2012

(87) PCT Pub. No.: WO2011/125573
PCT Pub. Date: Oct. 13, 2011

(65) Prior Publication Data
US 2013/0022334 A1    Jan. 24, 2013

(30) Foreign Application Priority Data

Apr. 8, 2010    (JP) ................................. 2010-089446

(51) Int. Cl.
*H04N 5/91*    (2006.01)
*H04N 5/917*    (2006.01)
(52) U.S. Cl.
USPC ........................................... 386/326; 386/332
(58) Field of Classification Search
USPC .................. 386/326, 332, 334, 336, 338, 353
See application file for complete search history.

(56) References Cited

U.S. PATENT DOCUMENTS

2010/0086285 A1*    4/2010    Sasaki et al. .................. 386/108
2011/0038614 A1    2/2011    Chen et al.

FOREIGN PATENT DOCUMENTS

WO    2009 133714    11/2009

OTHER PUBLICATIONS

U.S. Appl. No. 13/636,142, filed Sep. 20, 2012, Hamada.
U.S. Appl. No. 13/636,135, filed Sep. 20, 2012, Hamada.
U.S. Appl. No. 13/637,309, filed Sep. 25, 2012, Hamada.
U.S. Appl. No. 13/638,185, filed Sep. 28, 2012, Hamada.
International Search Report Issued Jun. 28, 2011 in PCT/JP11/57535 Filed Mar. 28, 2011.

* cited by examiner

*Primary Examiner* — Robert Chevalier
(74) *Attorney, Agent, or Firm* — Sony Corporation

(57) ABSTRACT

A data recording/playing configuration capable of easily acquiring attribute information on a frame constituting a 3D image recorded on a recording medium. The attribute information of the 3D image is recorded in each of hierarchized management information files as an attribute in units of management data of each of the management information files. When a coding method is a frame sequential method, frame identification data indicating whether each frame is a left-eye image (L image) or a right-eye image (R image) are recorded; and when the coding method is an inter-view reference coding method where any one of L and R images is referred to during decoding, base image identification data indicating which one of the L and R images is a base image are recorded. Thereby, a playing apparatus can determine an attribute of a frame without performing analysis of data to be played.

20 Claims, 44 Drawing Sheets

FIG. 1
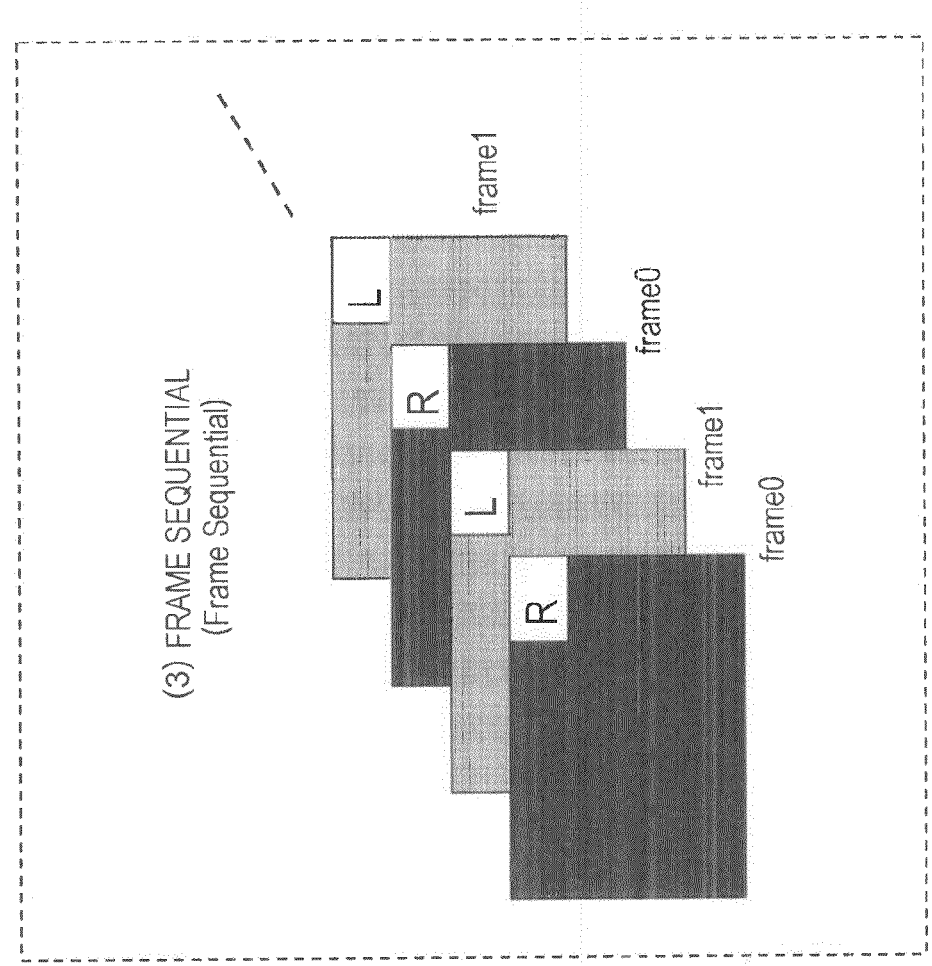
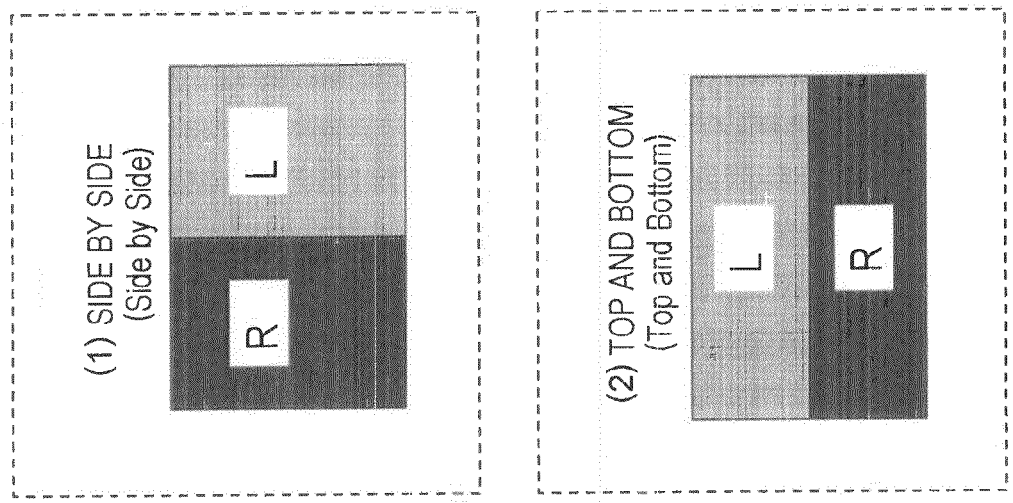

FIG. 6

| Syntax | No. of bits | Mnemonic |
|---|---|---|
| info.bdav { | | |
|   type_indicator | 8*4 | bslbf |
|   version_number | 8*4 | bslbf |
|   TableOfPlayLists_start_address | 32 | uimsbf |
|   MakersPrivateData_start_address | 32 | uimsbf |
|   reserved_for_future_use | 192 | bslbf |
|   UIAppInfoBDAV() | | |
|   for(i=0; i<N1; i++){ | | |
|     padding_word | 16 | bslbf |
|   } | | |
|   TableOfPlayLists() | | |
|   for(i=0; i<N2; i++){ | | |
|     padding_word | 16 | bslbf |
|   } | | |
|   MakersPrivateData() | | |
|   for(i=0; i<N3; i++){ | | |
|     padding_word | 16 | bslbf |
|   } | | |
| } | | |

101
102
103 MAKER PRIVATE DATA AREA

FIG. 7

| Syntax | No. of bits | Mnemonic |
|---|---|---|
| MakersPrivateData() { | | |
|   length | 32 | uimsbf |
|   if(length !=0){ | | |
|     data_block_start_address | 32 | uimsbf |
|     reserved_for_word_align | 24 | bslbf |
|     number_of_maker_entries | 8 | uimsbf |
|     for (i=0; i<number_of_maker_entries; i++){ | | |
|       maker_ID | 16 | uimsbf |
|       maker_model_code | 16 | uimsbf |
|       mpd_start_address | 32 | uimsbf |
|       mpd_length | 32 | uimsbf |
|     } | | |
|     for (i=0; i<L1; i++) { | | |
|       padding_word | 16 | bslbf |
|       padding_word | 16 | bslbf |
|     } | | |
|     data_block | 32 + 8*(length − data_block_start_address) | |
|   } | | |
| } | | |

111: maker_ID, maker_model_code
112: mpd_start_address, mpd_length
113: data_block

FIG. 8

| Field name | Value |
|---|---|
| maker_ID | 0x2000 |
| maker_model_code | 0x0100 |

FIG. 9

| Syntax | No. of bits | Mnemonic |
|---|---|---|
| Multiview_video_info_for_Index() { | | |
| length | 32 | uimsbf |
| reserved_for_future_use | 32 | bslbf |
| identifier | 128 | bslbf |
| reserved_for_future_use | 15 | bslbf |
| Index_multiview_video_flag | 1 | bslbf |
| reserved_for_future_use | 16 | bslbf |
| for (i=0; i< L1; i++) { | | |
| reserved_for_future_use | 16 | bslbf |
| reserved_for_future_use | 16 | bslbf |
| } | | |
| } | | |

| value | meaning |
|---|---|
| 0 | ONLY 2D CONTENT IS INCLUDED UNDER DIRECTORY TO BE MANAGED, BUT 3D CONTENT IS NOT INCLUDED. |
| 1 | 3D CONTENT IS LIKELY TO BE INCLUDED UNDER DIRECTORY TO BE MANAGED. |

FIG. 11

| Syntax | No. of bits | Mnemonic |
|---|---|---|
| Multiview_video_info_for_PlayList() { | | |
|     length | 32 | uimsbf |
|     reserved_for_future_use | 32 | bslbf |
|     identifier | 128 | bslbf |
|     reserved_for_future_use | 15 | bslbf |
|     PlayList_multiview_video_flag | 1 | bslbf |
|     reserved_for_future_use | 1 | bslbf |
|     PlayList_multiview_video_configuration | 7 | uimsbf |
|     reserved_for_future_use | 2 | bslbf |
|     PlayList_frame0_is_Left_flag | 6 | uimsbf |
|     reserved_for_future_use | 2 | bslbf |
|     PlayList_base_view_is_Left_flag | 6 | uimsbf |
|     reserved_for_future_use | 2 | bslbf |
|     PlayList_MainPath_is_Left_flag | 6 | uimsbf |
|     reserved_for_future_use | 6 | bslbf |
|     PlayList_use_entropy_coding_mode_flag | 2 | uimsbf |
|     reserved_for_future_use | 6 | bslbf |
|     PlayList_use_inter-view_prediction_flag | 2 | uimsbf |
|     reserved_for_future_use | 16 | bslbf |
|     for (i=0; i< L1; i++) { | | |
|         reserved_for_future_use | 16 | bslbf |
|         reserved_for_future_use | 16 | bslbf |
|     } | | |
| } | | |

Labels on rows: 121 → PlayList_multiview_video_flag; 122 → PlayList_multiview_video_configuration; 123 → PlayList_frame0_is_Left_flag; 124 → PlayList_base_view_is_Left_flag; 125 → PlayList_MainPath_is_Left_flag; 126 → PlayList_use_entropy_coding_mode_flag; 127 → PlayList_use_inter-view_prediction_flag

FIG. 12

| value | meaning |
|---|---|
| 0 | PlayList INCLUDES ONLY 2D CONTENT BUT NOT 3D CONTENT. |
| 1 | PlayList IS LIKELY TO INCLUDE 3D CONTENT.<br>The value of PlayList_Multiview_video_configuration is valid |

FIG. 13

| value | meaning |
|---|---|
| 0 | reserved for "checkerboard" |
| 1 | reserved for "column based interleaving" |
| 2 | reserved for "row based interleaving" |
| 3 | side by side |
| 4 | top and bottom |
| 5 | frame sequential |
| 6-19 | reserved |
| 20 | no information |
| 21-29 | reserved |
| 30 | 2 elementary streams encoded by MVC, and 1 system stream (1 Clip AV stream file). |
| 31 | 2 elementary streams encoded by MVC, and 2 system streams (2 Clip AV stream files). |
| 32 | 1 elementary stream encoded by MVC and 1 system stream (1 Clip AV stream file) |
| 33-39 | reserved |
| 40 | Independent 2 elementary streams, and 1 system stream (1 Clip AV stream file). (Encoding method is not MVC.) |
| 41 | Independent 2 elementary streams, and 2 system streams (2 Clip AV stream files). (Encoding method is not MVC.) |
| 42-127 | reserved |

FIG. 14

| value | meaning |
|---|---|
| 0 | no information |
| 1 | reserved |
| 2 | frame 0 is Right view |
| 3 | frame 0 is Left view |
| 4-31 | reserved |

FIG. 15

| value | meaning |
|---|---|
| 0 | no information |
| 1 | reserved |
| 2 | base view is Right view |
| 3 | base view is Left view |
| 4-31 | reserved |

FIG. 16

| value | meaning |
|---|---|
| 0 | no information |
| 1 | reserved |
| 2 | MainPath is Right view |
| 3 | MainPath is Left view |
| 4-31 | reserved |

FIG. 18

| value | meaning |
|---|---|
| 0 | no information |
| 1 | entropy coding mode is not used at all |
| 2 | entropy coding mode may be used |
| 3 | reserved |

FIG. 19

| value | meaning |
|---|---|
| 0 | no information |
| 1 | inter-view prediction is not used at all |
| 2 | inter-view prediction may be used |
| 3 | reserved |

FIG. 20

| Syntax | No. of bits | Mnemonic |
|---|---|---|
| PlayList() { | | |
|   length | 32 | uimsbf |
|   reserved_for_word_align | 12 | bslbf |
|   PL_CPI_type | 4 | bslbf |
|   number_of_PlayItems | 16 | uimsbf |
|   if (<Virtual-PlayList> && PL_CPI_type==1) { | | |
|     number_of_SubPlayItems | 16 | uimsbf |
|   }else{ | | |
|     reserved_for_word_align | 16 | bslbf |
|   } | | |
|   for (PlayItem_id=0; | | |
|     PlayItem_id<number_of_PlayItems; | | |
|     PlayItem_id++) { | | |
|     PlayItem()  — 141 | | |
|   } | | |
|   if (<Virtual-PlayList> && PL_CPI_type==1) { | | |
|     for (i = 0; i < number_of_SubPlayItems; i++) { | | |
|       SubPlayItem()  — 142 | | |
|     } | | |
|   } | | |
| } | | |

FIG. 21

| Syntax | No. of bits | Mnemonic |
|---|---|---|
| SubPlayItem() { | | |
|   length | 16 | uimsbf |
|   Clip_Information_file_name | 8*5 | bslbf |
|   Clip_codec_identifier | 8*4 | bslbf |
|   reserved_for_future_use | 8 | bslbf |
|   SubPlayItem_type | 8 | bslbf |
|   ref_to_STC_id | 8 | uimsbf |
|   SubPlayItem_IN_time | 32 | uimsbf |
|   SubPlayItem_OUT_time | 32 | uimsbf |
|   sync_PlayItem_id | 16 | uimsbf |
|   sync_start_PTS_of_PlayItem | 32 | uimsbf |
| } | | |

FIG. 22

| SubPlayItem_type | Meaning |
|---|---|
| 0 | reserved for future use |
| 1 | Auxiliary audio stream path |
| 2 | Secondary view video stream path |
| 3 ? 255 | reserved for future use |

FIG. 23

| Syntax | | No. of bits | Mnemonic |
|---|---|---|---|
| zzzzz.clpi { | | | |
| | type_indicator | 8*4 | bslbf |
| | version_number | 8*4 | bslbf |
| | SequenceInfo_start_address | 32 | uimsbf |
| | ProgramInfo_start_address | 32 | uimsbf |
| | CPI_start_address | 32 | uimsbf |
| | ClipMark_start_address | 32 | uimsbf |
| | MakersPrivateData_start_address | 32 | uimsbf |
| | reserved_for_future_use | 96 | bslbf |
| 201 { | ClipInfo() | | |
| | for(i=0; i<N1; i++){ | | |
| | padding_word | 16 | bslbf |
| | } | | |
| 202 { | SequenceInfo() | | |
| | for(i=0; i<N2; i++){ | | |
| | padding_word | 16 | bslbf |
| | } | | |
| 203 { | ProgramInfo() | | |
| | for(i=0; i<N3; i++){ | | |
| | padding_word | 16 | bslbf |
| | } | | |
| 204 { | CPI() | | |
| | for(i=0; i<N4; i++){ | | |
| | padding_word | 16 | bslbf |
| | } | | |
| 205 { | ClipMark() | | |
| | for(i=0; i<N5; i++){ | | |
| | padding_word | 16 | bslbf |
| | } | | |
| 206 { | MakersPrivateData() | | |
| | for(i=0; i<N6; i++){ | | |
| | padding_word | 16 | bslbf |
| | } | | |
| } | | | |

FIG. 25

| Syntax | No. of bits | Mnemonic |
|---|---|---|
| ProgramInfo() { | | |
|     length | 32 | uimsbf |
|     reserved_for_word_align | 8 | bslbf |
|     num_of_program_sequences | 8 | uimsbf |
|     for(i=0; i<*num_of_program_sequences*; i++){ | | |
|         SPN_program_sequence_start*[i]* | 32 | uimsbf |
|         program_map_PID*[i]* | 16 | bslbf |
|         num_of_streams_in_ps*[i]* | 8 | uimsbf |
|         num_of_groups*[i]* | 8 | uimsbf |
|         for (stream_index=0;<br>            stream_index < num_of_streams_in_ps[i];<br>            stream_index++) { | | |
|             stream_PID*[i][stream_index]* | 16 | uimsbf |
|             StreamCodingInfo(i, stream_index) | | |
|         } | | |
|         if (*num_of_groups[i]* > 1) { | | |
|             for(j=0; j<*num_of_groups[i]*; j++) { | | |
|                 num_of_streams_in_group*[i][j]* | 8 | uimsbf |
|                 for (k=0; k<*num_of_streams_in_group[i][j]*;k++) { | | |
|                       ref_to_stream_index*[i][j][k]* | 8 | uimsbf |
|                 } | | |
|                 if (num_of_streams_in_group*[i][j]*%2==0) { | | |
|                       reserved_for_word_align | 8 | bslbf |
|                 } | | |
|             } | | |
|         } | | |
|     } | | |
| } | | |

FIG. 26

| Syntax | No. of bits | Mnemonic |
|---|---|---|
| CPI() { | | |
|   length | 32 | uimsbf |
|   reserved_for_word_align | 12 | bslbf |
|   CPI_type | 4 | uimsbf |
|   if (CPI_type == 1) { | | |
|     EP_map() | | |
|   } else if (CPI_type == 2) { | | |
|     TU_map() | | |
|   } | | |
| } | | |

210

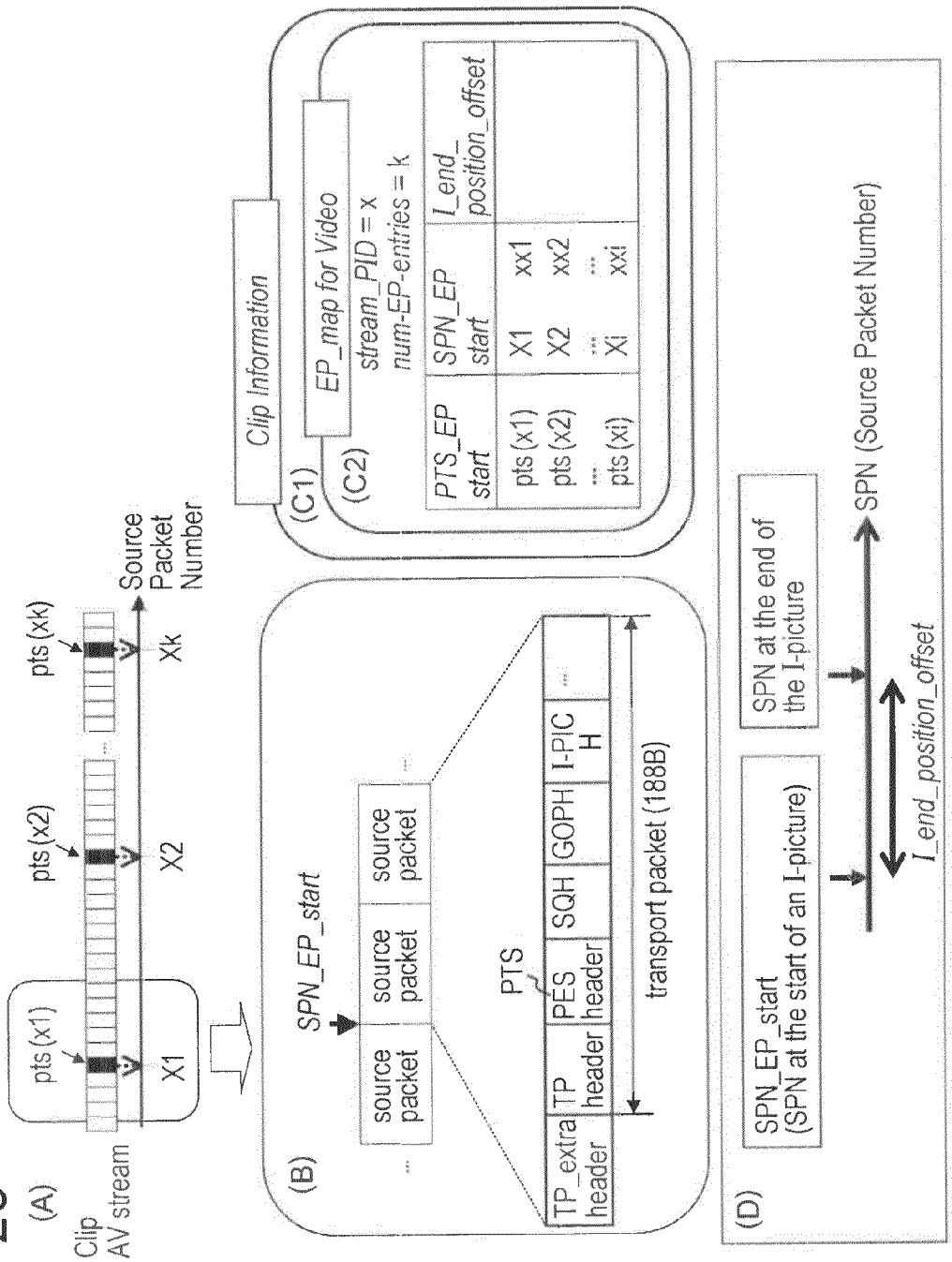

FIG. 29

| Syntax | No. of bits | Mnemonic |
|---|---|---|
| Multiview_video_info_for_ClipInfo() { | | |
|     length | 32 | uimsbf |
|     reserved_for_future_use | 32 | bslbf |
|     identifier | 128 | bslbf |
|     reserved_for_future_use | 16 | bslbf |
|     reserved_for_future_use | 8 | bslbf |
|     number_of_program_sequences | 8 | uimsbf |
|     for(i=0; i<*number_of_program_sequences*; i++){ | | |
|         reserved_for_future_use | 15 | bslbf |
|         ClipInfo_multiview_video_flag[i] | 1 | bslbf |
|         reserved_for_future_use | 1 | bslbf |
|         ClipInfo_multiview_video_configuration[i] | 7 | uimsbf |
|         reserved_for_future_use | 2 | bslbf |
|         ClipInfo_frame0_is_Left_flag[i] | 6 | uimsbf |
|         reserved_for_future_use | 2 | bslbf |
|         ClipInfo_base_view_is_Left_flag[i] | 6 | uimsbf |
|         reserved_for_future_use | 2 | bslbf |
|         ClipInfo_this_Clip_is_Left_flag[i] | 6 | uimsbf |
|         reserved_for_future_use | 6 | bslbf |
|         ClipInfo_use_entropy_coding_mode_flag[i] | 2 | bslbf |
|         reserved_for_future_use | 6 | bslbf |
|         ClipInfo_use_inter-view_prediction_flag[i] | 2 | bslbf |
|         reserved_for_future_use | 16 | bslbf |
|     } | | |
|     for (i=0; i< L1; i++) { | | |
|         reserved_for_future_use | 16 | bslbf |
|         reserved_for_future_use | 16 | bslbf |
|     } | | |
| } | | |

220: number_of_program_sequences
221: ClipInfo_multiview_video_flag[i]
222: ClipInfo_multiview_video_configuration[i]
223: ClipInfo_frame0_is_Left_flag[i]
224: ClipInfo_base_view_is_Left_flag[i]
225: ClipInfo_this_Clip_is_Left_flag[i]
226: ClipInfo_use_entropy_coding_mode_flag[i]
227: ClipInfo_use_inter-view_prediction_flag[i]

FIG. 30

| value | meaning |
|---|---|
| 0 | program_sequence INCLUDES ONLY 2D CONTENT BUT NOT 3D CONTENT. The value of ClipInfo_Multiview_video_configuration is invalid |
| 1 | program_sequence IS LIKELY TO INCLUDE 3D CONTENT. The value of ClipInfo_Multiview_video_configuration is valid |

FIG. 31

| value | meaning |
|---|---|
| 0 | reserved for "checkerboard" |
| 1 | reserved for "column based interleaving" |
| 2 | reserved for "row based interleaving" |
| 3 | side by side |
| 4 | top and bottom |
| 5 | frame sequential |
| 6-19 | reserved |
| 20 | no information |
| 21-29 | reserved |
| 30 | 2 elementary streams encoded by MVC, and 1 system stream. (This Clip includes both of the 2 elementary streams encoded by MVC). |
| 31 | 2 elementary streams encoded by MVC, and 2 system streams. (This Clip includes one of the 2 elementary streams encoded by MVC) |
| 32 | 1 elementary stream encoded by MVC and 1 system stream. |
| 33-39 | reserved |
| 40 | Independent 2 elementary streams, and 1 system stream. (This Clip includes both of the 2 elementary streams. Encoding method is not MVC.) |
| 41 | Independent 2 elementary streams, and 2 system streams. (This Clip includes one of the 2 elementary streams. Encoding method is not MVC.) |
| 42-127 | reserved |

FIG. 32

| value | meaning |
|---|---|
| 0 | no information |
| 1 | reserved |
| 2 | frame 0 is Right view |
| 3 | frame 0 is Left view |
| 4-31 | reserved |

FIG. 33

| value | meaning |
|---|---|
| 0 | no information |
| 1 | reserved |
| 2 | base view is Right view |
| 3 | base view is Left view |
| 4-31 | reserved |

FIG. 34

| value | meaning |
|---|---|
| 0 | no information |
| 1 | reserved |
| 2 | this Clip is Right view |
| 3 | this Clip is Left view |
| 4-31 | reserved |

FIG. 35

| value | meaning |
|---|---|
| 0 | no information |
| 1 | entropy coding mode is not used at all |
| 2 | entropy coding mode may be used |
| 3 | reserved |

FIG. 36

| value | meaning |
|---|---|
| 0 | no information |
| 1 | inter-view prediction is not used at all |
| 2 | inter-view prediction may be used |
| 3 | reserved |

INFORMATION PROCESSING DEVICE, INFORMATION RECORDING MEDIUM, INFORMATION PROCESSING METHOD, AND PROGRAM

TECHNICAL FIELD

The present invention relates to an information processing device, an information recording medium, an information processing method, and a program, and more particularly, to an information processing device, an information recording medium, an information processing method, and a program performing a data recording process or a data playing process with respect to a three-dimensional image (3D image) using a recording medium such as a disc or a flash memory.

BACKGROUND ART

Recently, display apparatuses such as a TV capable of displaying a three-dimensional image (3D image), video cameras and still cameras capable of recording three-dimensional images (3D images), and the like have been developed and utilized. The 3D image is obtained by performing a displaying process using images photographed from different viewing points, that is, a left-eye image and a right-eye image. Therefore, in the case of recording the 3D image on a medium, a set of the left-eye image and the right-eye image needs to be recorded, and during a playing process, playing is performed using a set of the images.

With respect to a coding method performed during recording or transmitting of 3D image data, there are various methods. For example, representative methods are known as follows:

a frame sequential method,
a side-by-side method, and
a top-and-bottom method.

The frame sequential method is a coding method where frames of left-eye images (L images) and frames of right-eye images (R images) are alternately recorded and transmitted as L, R, L, R, and so on.

The side-by-side method is a coding method where the L and R images are divided into left and right portions of a 1-frame image to be recorded and transmitted.

The top-and-bottom method is a coding method where the L and R images are divided into upper and lower portions of a 1-frame image to be recorded and transmitted.

Currently, various methods have been mixedly used. For example, 3D content transmitted by a broadcasting station dedicated to television broadcasting are processed according to the side-by-side method. In addition, a recording method of a video camera is the frame sequential method. In the current situation where various methods are mixedly used, for example, in the case of recording data in a recording/playing apparatus, information for determining methods or control information or attribute information corresponding to each method needs to be recorded. In addition, during the playing, each method needs to be determined, and playing needs to be performed by using control information or attribute information according to each method. However, some of currently-used video recording or playing standards for a medium have problems in that a recording area for control information or attribute information of the various 3D image methods is not set.

For example, as a video recording/playing application standard (format), there is a BDMV or BDAV standard (format). This application standard is regulated as a data recording/playing application standard mainly using BD (Blu-ray Disc (registered trademark)). The BD standard is disclosed in, for example, Patent Document 1 (Japanese Patent Application Laid-Open No. 2002-158972) and Patent Document 2 (Japanese Patent Application Laid-Open No. 2007-179671). Although the BDMV or BDAV standard is a data recording/playing application standard mainly using BD, the standard is not limited to the BD, but it may be adapted to data recording/playing using a flash memory or other media rather than the BD.

The BDMV standard is an application standard which is developed to be dedicated to a BD-ROM where, for example, movie content or the like are recorded in advance and is widely used for a non-rewritable BD-ROM for mainly package content or the like. The BDMV has a feature in that a navigator command or BD-J as a program controlling playing according to user's manipulation is stored in the disc, so that various interactive functions can be provided according to content maker's intention. In addition, the BDMV has a feature in that recording/playing can be performed by using a menu screen configured with graphics and buttons.

As described above, the BDMV standard is an application standard which is dedicated to a BD-ROM where mainly movie content or the like are recorded in advance, and in specifications thereof, various control information or attribute information unique to content can be recorded so that content can be recorded and played according to content maker's intention. The control information or attribute information necessary for recording and playing the 3D image can be recorded according to the BDMV standard, and discs adapted to the BDMV standard on which 3D content is recorded have already been provided to users.

Note that, on December, 2009, the BDA (Blu-ray Disc Association) announced final decision of the specification of Blu-ray 3D with respect to a 3D image recording/playing method adapted to the BD, so that environments of allowing consumers to experience and enjoy 3D content at home are regulated well. The specification is disclosed in Non-Patent Document 1 [http://www.blu-raydisc.com/jp/Press/PressRelease.html]. The specification relates to an extended BDMV standard capable of storing 3D content in the BD-ROM as a read-only medium and is regulated as "BD-ROM Part3 ver2.4".

On the other hand, the BDAV is a standard developed for the purpose of being applied to a data recording/playing process using mainly a rewritable BD-RE disc, one-time recordable BD-R disc, or the like. The BDAV standard is used when a user records or plays, for example, video photographed by a video camera or the like on the BD-RE disc or the BD-R disc. Otherwise, the BDAV standard is used for recording or playing television broadcasting content in a video recorder or the like. However, since the BDAV standard is contrived so as for a user to easily record data, the BDAV standard has a feature in that the standard is not appropriate for complicated control information recording and playing. For example, in comparison with the BDMV, the BDAV standard has a feature in that an interactive function or a function of implementing various control for content recording/playing is not good.

As described above, although the BD-ROM-dedicated BDMV standard can be used for recording and playing a 3D image, in the currently-used BDAV standard, a recording area for information necessary for recording and playing 3D image content is not regulated. In addition, in BD-RE Part3 ver3.x called the BDMV standard which is not used for a BD-ROM and which is a data recording/playing application standard using a rewritable recording medium or one-time recordable recording medium, similarly to the BDAV standard, a recording area for information necessary for recording and playing 3D image content is not regulated.

Therefore, although 3D image data photographed by a camera which can photographs 3D images are recorded according to the BDAV standard, data necessary for playing the 3D image are lost, so that the 3D image may not be played. Similarly, although 3D image content received on a broadcast wave are recorded by a BD recorder or the like according to the BDAV standard, there is a problem in that, data necessary for playing the 3D image are lost, so that the 3D image may not be played.

CITATION LIST

Patent Documents

Patent Document 1: Japanese Patent Application Laid-Open No. 2002-158972
Patent Document 2: Japanese Patent Application Laid-Open No. 2007-179671

Non-Patent Document

Non-Patent Document 1: http://www.blu-raydisc.com/jp/Press/PressRelease.html

SUMMARY OF THE INVENTION

Problems to be Solved by the Invention

The present invention is to provide an information processing device, an information recording medium, an information processing method, and a program capable of implementing recording information necessary for recording and playing a 3D image or of implementing playing the 3D image by using the information.

The present invention is also to provide an information processing device, an information recording medium, an information processing method, and a program capable of recording or playing a 3D image in a data recording/playing process using a standard where a recording area for information necessary for recording and playing the 3D image is not regulated, for example, a BDAV standard or the like.

Solutions to Problems

A first aspect of the present invention is an information processing device including:
a data processing unit which performs a data recording process on a recording medium,
wherein, during the data recording process on the recording medium, the data processing unit performs a process of recording attribute information of a 3D image included in recorded data in each of hierarchized management information files as an attribute in units of management data of each of the management information files, and attribute information on a frame constituting the 3D image is included in the attribute information to be recorded.

Furthermore, according an embodiment of the information processing device of the present invention, in the case where a method of coding the 3D image is a frame sequential method, the data processing unit may perform a process of recording frame identification data indicating whether a frame constituting the 3D image is a left-eye image (L image) or a right-eye image (R image) as the attribute information in the management information file.

Furthermore, according an embodiment of the information processing device of the present invention, in the case where a method of coding the 3D image is an inter-view reference coding method where any one of a left-eye image (L image) frame and a right-eye image (R image) frame is set as a base image which is a reference image during decoding, the data processing unit may perform a process of recording base image identification data indicating which one of the L and R images is the base image as the attribute information in the management information file.

Furthermore, according an embodiment of the information processing device of the present invention, the data processing unit allows the attribute information to further include 3D image configuration information indicating a method of coding the 3D image and to be recorded in the management information file.

Furthermore, according an embodiment of the information processing device of the present invention, the data processing unit records the attribute information in units of management data of each of the management information files in each of the management information files including:
(a) a clip information file set to be in correspondence with a stream file which is a file storing image data; and
(b) a play list file having playing section designation information with respect to the clip information file.

Furthermore, a second aspect of the present invention is an information processing device including:
a data processing unit which performs a data playing process on data from a recording medium,
wherein, during the data playing process on the data from the recording medium, the data processing unit sequentially reads attribute information of a coded 3D image recorded on the recording medium from each of hierarchized management information files, acquires attribute information on a frame constituting the 3D image as an attribute in units of management data of each of the management information files, and performs a decoding process according to the acquired attribute information.

Furthermore, according an embodiment of the information processing device of the present invention, in the case where a method of coding the 3D image recorded on the recording medium is a frame sequential method, the attribute information may include frame identification data indicating whether a frame constituting the 3D image is a left-eye image (L image) or a right-eye image (R image), and the data processing unit may read the frame identification data from the management information file and perform a decoding process where the left-eye image (L image) and the right-eye image (R image) are correctly determined according to the read frame identification data.

Furthermore, according an embodiment of the information processing device of the present invention, in the case where a method of coding the 3D image is an inter-view reference coding method where anyone of a left-eye image (L image) frame and a right-eye image (R image) frame is set as a base image which is a reference image during decoding, the attribute information may include base image identification data indicating which one of the L and R images is the base image, and the data processing unit may reads the base image identification data from the management information file and perform a decoding process where the base view are correctly determined according to the read base image identification data.

Furthermore, according an embodiment of the information processing device of the present invention, the attribute information includes 3D image configuration information indicating a method of coding the 3D image, and the data processing unit determines a method of coding the 3D image recorded in the recording medium based on the 3D image configuration information.

Furthermore, according an embodiment of the information processing device of the present invention, the attribute information is recorded in each of the management information files including:

(a) a clip information file set to be in correspondence with a stream file which is a file storing image data; and (b) a play list file having playing section designation information with respect to the clip information file, and the data processing unit reads the attribute information in units of management data from a management information file selected according to data to be played in an order of the play list file and the clip information file.

Furthermore, a third aspect of the present invention is an information recording medium on which image data is recorded, including, as recorded data:

a stream file storing 3D image data as content to be played; and management information files having a hierarchized configuration storing management information for the content, wherein each of the hierarchized management information files stores attribute information on a frame constituting the 3D image data as attribute information of a 3D image included in recording content, and wherein a playing apparatus for playing the content analyzes an attribute with respect to the coding process of the 3D image included in the recording content of the information recording medium in units of management data of each of the management information files by sequentially referring to the attribute information according to a hierarchy of the management information files.

Furthermore, according an embodiment of the information recording medium of the present invention, in the case where a method of coding the 3D image is a frame sequential method, the attribute information may include frame identification data indicating whether a frame constituting the 3D image is a left-eye image (L image) or a right-eye image (R image), and the playing apparatus may be allowed to read the frame identification data from the management information file and to perform a decoding process where the left-eye image (L image) and the right-eye image (R image) are correctly determined according to the read frame identification data.

Furthermore, according an embodiment of the information recording medium of the present invention, in the case where a method of coding the 3D image is an inter-view reference coding method where anyone of a left-eye image (L image) frame and a right-eye image (R image) frame is set as a base image which is a reference image during decoding, the attribute information may include base image identification data indicating which one of the L and R images is the base image, and the playing apparatus may be allowed to read the base image identification data from the management information file and to perform a decoding process where the left-eye image (L image) and the right-eye image (R image) are correctly determined according to the read frame identification data.

Furthermore, according an embodiment of the information recording medium of the present invention, the attribute information may include 3D image configuration information indicating the method of coding the 3D image, and the playing apparatus may be allowed to determine the method of coding the 3D image recorded on the recording medium based on the 3D image configuration information.

Furthermore, according an embodiment of the information recording medium of the present invention, the attribute information is recorded in each of the management information files including:

(a) a clip information file set to be in correspondence with a stream file which is a file storing image data; and (b) a play list file having playing section designation information with respect to the clip information file, and wherein the playing apparatus reads the attribute information from a management information file selected according to data to be played in an order of the play list file and the clip information file and analyzes an attribute with respect to a coding process for the 3D image in units of data to be managed by each of the management information files.

Furthermore, a fourth aspect of the present invention is an information processing method for causing an information processing device to perform a data recording process on a recording medium, wherein, during the data recording process on the recording medium, a data processing unit performs a process of recording attribute information of a 3D image included in recorded data in each of hierarchized management information files as an attribute in units of management data of each of the management information files, and attribute information on a coding process for the 3D image is included in the attribute information to be recorded.

Furthermore, a fifth aspect of the present invention is an information processing method for causing an information processing device to perform a data playing process from a recording medium, wherein, during the data playing process from the recording medium, a data processing unit sequentially reads attribute information of a coded 3D image recorded in the recording medium from each of hierarchized management information files, acquires attribute information on a coding process for the 3D image as an attribute in units of management data of each of the management information files, and performs a decoding process according to the acquired attribute information.

Furthermore, a sixth aspect of the present invention is a program for causing an information processing device to perform a data recording process on a recording medium, the program causing a data processing unit to:

perform, during the data recording process on the recording medium, a process of recording attribute information of a 3D image included in recorded data in each of hierarchized management information files as an attribute in units of management data of each of the management information files; and allowing attribute information on a coding process of the 3D image to be included in the attribute information to be recorded.

Furthermore, a seventh aspect of the present invention is a program for causing an information processing device to perform a data playing process from a recording medium, the program causing a data processing unit to:

during the data playing process from the recording medium, sequentially read attribute information of a coded 3D image recorded on the recording medium from each of hierarchized management information files, acquire attribute information on a coding process for the 3D image as an attribute in units of management data of each of the management information files, and perform a decoding process according to the acquired attribute information.

Note that a program according to the present invention is a program which is provided to, for example, a storage medium, for example, in an information processing device or a computer system capable of executing various programs and codes. The program is allowed to be executed on a program execution unit on an information processing device or a computer system, so that a process according to the program is implemented.

Other objects, features, and advantages of the present invention will be clarified through more detailed description based on the later-described embodiments or the attached drawings. Note that, in the specification, a system is a logical collective configuration of a plurality of apparatuses, and the constituent apparatuses are not limited so as to be contained in the same casing.

Effects of the Invention

According to an embodiment of the present invention, it is possible to implement a data recording/playing configuration capable of easily acquiring attribute information on a frame constituting a 3D image recorded on a recording medium. The attribute information of the 3D image is recorded in each of hierarchized management information files as an attribute in units of management data of each of the management information files. In the case where a coding method is a frame sequential method, frame identification data indicating whether each frame is a left-eye image (L image) or a right-eye image (R image) are recorded; and in the case where the coding method is an inter-view reference coding method where any one of L and R images is referred to during decoding, base image identification data indicating which one of the L and R images is a base image are recorded. According to the configuration, a playing apparatus can determine an attribute of a frame without performing analysis of data to be played.

BRIEF DESCRIPTION OF DRAWINGS

FIG. 1 is a diagram illustrating a 3D image coding method.
FIG. 6 is a diagram illustrating syntax of an information file [info.bdav] which is defined as a management information file (data base file) in a BDAV standard.
FIG. 7 is a diagram illustrating syntax of a maker private data area of an information file [info.bdav].
FIG. 8 is a diagram illustrating a record example of a maker ID [maker_ID] recording area and a maker model code recording area of a maker private data area of an information file [info.bdav].
FIG. 9 is a diagram illustrating 3D image information recorded in a data block [data_block] recording area of a maker private data area of an information file [info.bdav].
FIG. 10 is a diagram illustrating a specific example of 3D image information recorded in a data block [data_block] recording area of a maker private data area of an information file [info.bdav].
FIG. 11 is a diagram illustrating data of a data block in a maker private data area of a play list file.
FIG. 12 is a diagram illustrating a specific example of data recorded in a data block in a maker private data area of a play list file.
FIG. 13 is a diagram illustrating a specific example of data recorded in a data block in a maker private data area of a play list file.
FIG. 14 is a diagram illustrating a specific example of data recorded in a data block in a maker private data area of a play list file.
FIG. 15 is a diagram illustrating a specific example of data recorded in a data block in a maker private data area of a play list file.
FIG. 16 is a diagram illustrating a specific example of data recorded in a data block in a maker private data area of a play list file.
FIG. 18 is a diagram illustrating a specific example of data recorded in a data block in a maker private data area of a play list file.
FIG. 19 is a diagram illustrating a specific example of data recorded in a data block in a maker private data area of a play list file.
FIG. 20 is a diagram illustrating syntax of a play list file.
FIG. 21 is a diagram illustrating detailed syntax of recorded data of a sub path (sub play item) information recording area 142.
FIG. 22 is a diagram illustrating a specific example of recorded data of a sub path (sub play item) information recording area of a play list file.
FIG. 23 is a diagram illustrating syntax of a clip information file.
FIG. 25 is a diagram illustrating syntax of ProgramInfo of a clip information file.
FIG. 26 is a diagram illustrating syntax of CPI of a clip information file.
FIG. 28 is a diagram illustrating an EP map recorded in CPI of a clip information file.
FIG. 29 is a diagram illustrating a specific example of 3D image information (multiview_video_info) recorded in a data block [data_block] recording area in a maker private data area of a clip information file.
FIG. 30 is a diagram illustrating a specific example of 3D image information recorded in a data block [data_block] recording area in a maker private data area of a clip information file.
FIG. 31 is a diagram illustrating a specific example of 3D image information recorded in a data block [data_block] recording area in a maker private data area of a clip information file.
FIG. 32 is a diagram illustrating a specific example of 3D image information recorded in a data block [data_block] recording area in a maker private data area of a clip information file.
FIG. 33 is a diagram illustrating a specific example of 3D image information recorded in a data block [data_block] recording area in a maker private data area of a clip information file.
FIG. 34 is a diagram illustrating a specific example of 3D image information recorded in a data block [data_block] recording area in a maker private data area of a clip information file.

FIG. 35 is a diagram illustrating a specific example of 3D image information recorded in a data block [data_block] recording area in a maker private data area of a clip information file.

FIG. 36 is a diagram illustrating a specific example of 3D image information recorded in a data block [data_block] recording area in a maker private data area of a clip information file.

MODE FOR CARRYING OUT THE INVENTION

Figure 2:
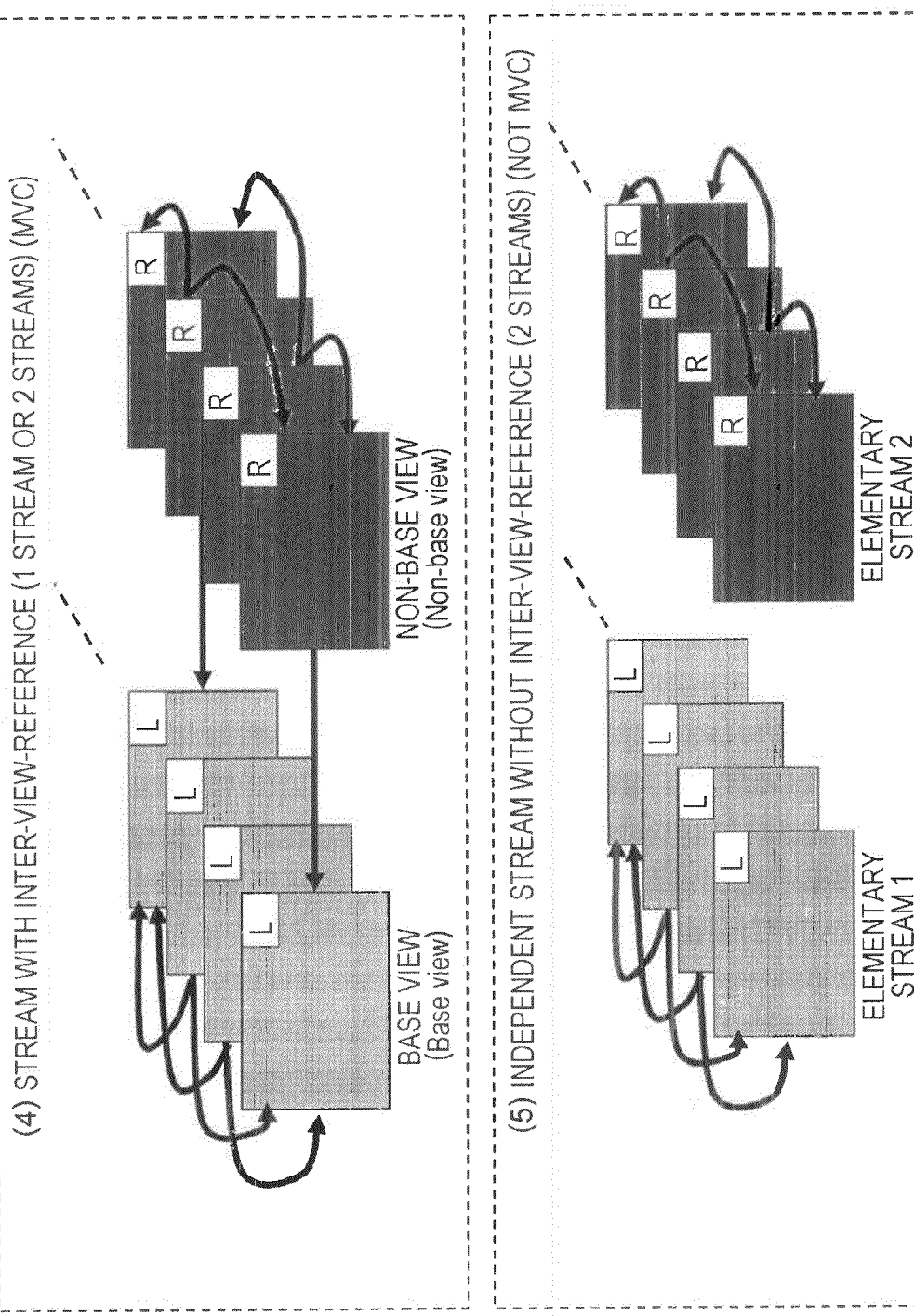
FIG. 2 is a diagram illustrating a 3D image coding method.

Hereinafter, an information processing device, an information recording medium, an information processing method, and a program according to the present invention will be described in detail with reference to the drawings. The description will be made according to the following list.

1. Overview of Sources of 3D image as Object of Recording/Playing Processes Using Recording Medium and 3D Image Coding Method 2. Overview of BDAV Standard 3. Recording Processes for 3D Image Information and Playing Processes using Recorded 3D Image Information 3-1. Recording Process and Using Process for 3D Image Information Using Management Information File (Database File)

3-1-a. Example of Recording 3D Image Information in Information File 3-1-b. Example of Recording 3D Image Information in Play list File 3-1-c. Example of Recording 3D Image Information in Play Path Information (Sub Play Item Information) of Play list File 3-1-d. Example of Recording 3D Image Information in Clip Information File 4. Process Sequences Performed by Information processing device 4-1. Recording Process Sequence for Content 4-2. Recording/Updating Process Sequences for 3D Image Information with Respect to Clip Information File 4-3. Recording/Updating Process Sequences for Frame 0 Image Identification Flag and Base Image Identification Flag as 3D Image Information with Respect to Clip Information File 4-4. Recording/Updating Process Sequences for 3D Image Information with Respect to Play list File 4-5. Additional Recording Process Sequence for content 4-6. Editing Process Sequence for content 4-7. Playing Process Sequence for content 5. Example of Configuration of Information processing device

[1. Overview of Sources of 3D Image as Object of Recording/Playing Processes Using Recording Medium and 3D Image Coding Method]

First, an overview of sources of providing a 3D image recordable on various recording medium such as a BD (Blu-ray Disc (registered trademark)) or a flash memory and currently-used 3D image coding methods will be described.

As objects of providing a 3D image recordable on a recording medium, there are, for example, the following providing objects.

(1) Broadcasting content provided by a broadcasting company such as a television station or the like (2) Content photographed by a video camera (3) Net-transmission content provided via a communication network such as the Internet For example, the 3D image content become recorded content with respect to a recording medium (BD, a flash memory, or the like).

During the recording or transmitting the 3D image, a coding process is performed according to a predetermined format. Examples of the 3D image coding method will be described.

The following five 3D image coding methods will be described with reference to FIGS. 1 and 2.

(1) side-by-side method (2) top-and-bottom method (3) Frame sequential method (4) Inter-view reference stream method (1-stream or 2-stream) (MVC)

(5) Non-inter-view reference 2-stream method (1) The side-by-side method is a coding method where the L and R images are divided into left and right portions of a 1-frame image to be recorded and transmitted. Note that the L image denotes a left-eye image, and R image denotes a right-eye image.

(2) The top-and-bottom method is a coding method where the L and R images are divided into upper and lower portions of a 1-frame image to be recorded and transmitted.

(3) The frame sequential method is a coding method where frames of the left-eye images (L images) and frames of the right-eye images (R images) are alternately recorded and transmitted as L, R, L, R, . . . .

(4) The inter-view reference stream method (1-stream or 2-stream) (MVC: Multi View Coding) is a coding method where any one of the L and R images is set as a base view, that is, a reference image referred to in a decoding process, and the other is set as a non-base view which is decoded with reference to the reference image in the decoding process. The arrows illustrated in the figure indicate the images as a reference object during the decoding of each image. In the example illustrated in the figure, the L image is set as a base view, and the R image is set as a non-base view. The method includes a 2-stream method where the L and R images are set as individual streams and a 1-stream method where the L and R images are mixed and set as one stream.

(5) The non-inter-view reference 2-stream method is a 2-stream method where the L and R images are set as individual streams and which has a configuration of referring to only the L image during the decoding of the L image and referring to only the R image during the decoding of the R image. In this method, the reference between views, that is, referring from L to R and referring from R to L is not needed.

With respect to the 3D image coding method, in this manner, there are various coding methods, and at present, methods used for broadcast content, video recording content, and the like are not unified. Therefore, in the case where the 3D image is recorded on, for example, a medium, information of identifying the method and various control information and attribute information according the method need to be recorded. In addition, during the playing, a decoding process needs to be performed according to the method of reading the 3D image coding method information recorded on the medium.

[2. Overview of BDAV Standard]

Next, an overview of a BDAV standard which is a data recording/playing standard (format) using a recording medium such as BD (Blu-ray Disc (registered trademark)) will be described.

As described above, there are a BDMV standard and a BDAV standard as application standard for data recording and playing using mainly BD (Blu-ray Disc (registered trademark)). Note that the standards are not limited to the BD but can be applied to the data recording and playing using other media.

The BDMV is an application standard developed so as to be dedicated to a BD-ROM on which, for example, movie content is recorded in advance.

The BDAV is an application standard developed for the purpose of use of a rewritable BD-RE and a one-time recordable BD-R.

Figure 3:
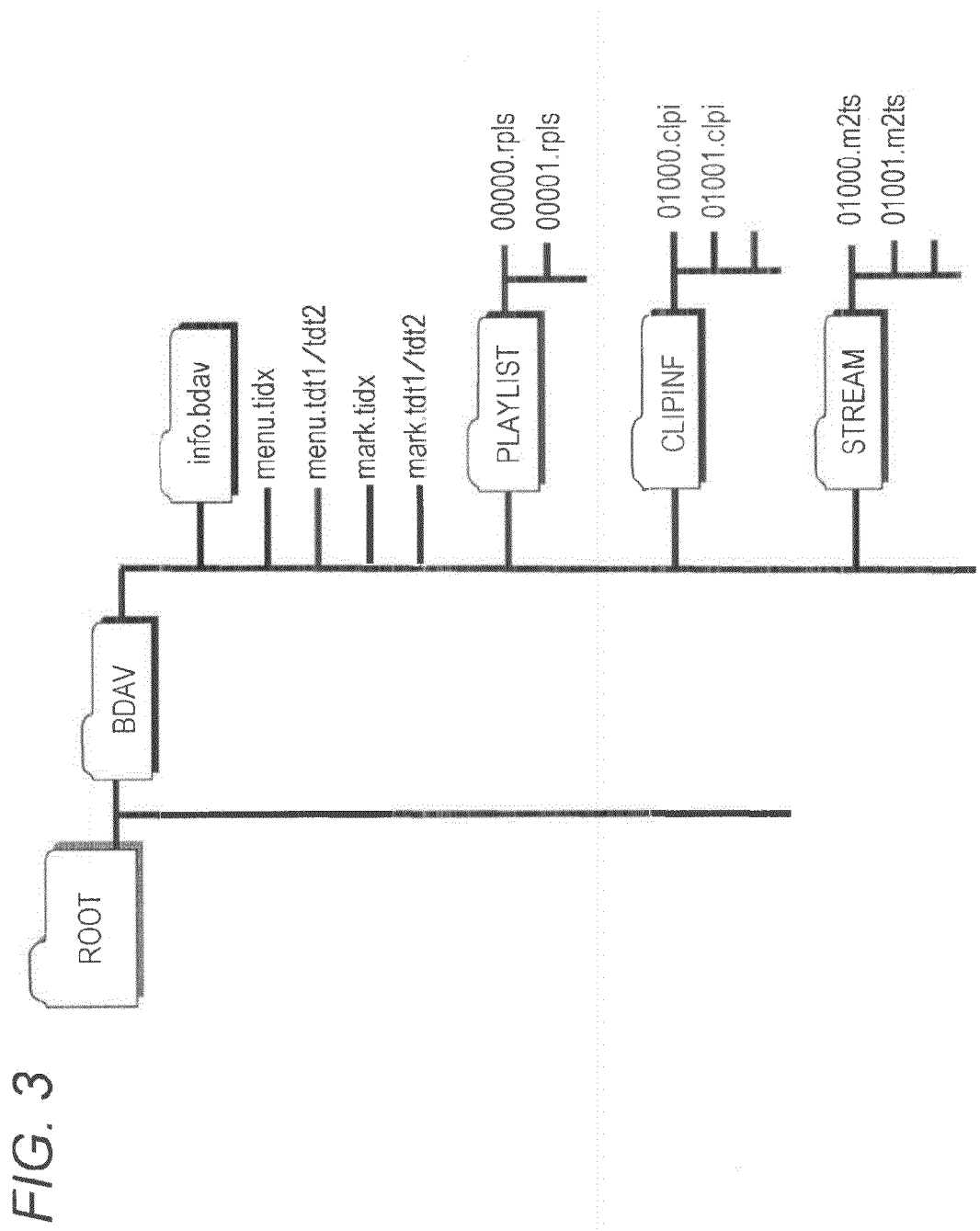
FIG. 3 is a diagram illustrating a BDAV directory which is a data recording configuration recorded on a medium according to a BDAV standard.

A BDAV directory which is a data recording configuration of data recorded on a medium according to the BDAV standard will be described with reference to FIG. 3. Note that, although there are various versions in the BDAV standard, the BDAV standard described hereinafter corresponds to a BD-RE 2.1 standard. As illustrated in FIG. 3, a directory [BDAV] is located under the root directory [Root].

Under the directory [BDAV], the following files are recorded.
information file [info.bdav]
menu file [menu.tidx], [menu.tdt1/tdt1]
mark file [mark.tidx], [mark.tdt1/tdt1]
In addition, as lower directories of the BDAV directory [BDAV], the following directories are set.
play list directory [PLAYLIST]
clip information directory [CLIPINF]
stream directory [STREAM]

A play list file [xxxxx.mpls] is set in the play list directory [PLAYLIST]; a clip information file [xxxxx.clpi] is set in the clip information directory [CLIPINF]; and an AV stream file [xxxxx.m2ts] is set in the stream directory [STREAM].

The information file [info.bdav] is a file according to the BDAV standard, which manages the overall disc and has a play list table. On the other hand, the index file is a file according to the BDMV standard, which similarly manages the overall disc and has a movie object table. Since the play list file is designated from the movie object, the index file is a file of indirectly designating the playlist. In addition, the information file and the index file have a common point in that the two files manage the overall disc. Therefore, in the case where plural kinds of 3D data needs to be recorded in the BDMV format, similarly to the addition to the BDAV format described below, the index file may be preferably recorded instead of the information file.

The menu files [menu.tidx] and [menu.tdt1/tdt2] store a thumbnail image of a representative picture of each AV stream file. [menu.tidx] stores thumbnail management information, and [menu.tdt1/tdt2] stores the thumbnail image.

In the BDAV standard, unlike the BDMV standard, there is no function of producing a menu including various information, and for example, a simplified menu display of displaying initial images of videos photographed by a user as thumbnail images is set to be performed. Therefore, the menu files [menu.tidx] and [menu.tdt1/tdt2] manage and store the thumbnail images.

The mark files [mark.tidx] and [mark.tdt1/tdt2] are files managing and storing thumbnail images corresponding to a mark position which is index information in an editing process or the like of the image (AV stream file) photographed by a user. [mark.tidx] stores thumbnail management information, and [mark.tdt1/tdt2] stores the thumbnail images.

A play list file [xxxxx.mpls] is set in the play list directory [PLAYLIST]; a clip information file [xxxxx.clpi] is set in the clip information directory [CLIPINF]; and a clip AV stream file [xxxxx.m2ts] is set in the stream directory [STREAM].

The information file through the clip information file are management information files applied to data playing for the data stored in the clip AV stream file. The management information file is called as a data base file or data base.

The information file is a management information file for the recorded data on the entire medium. As described above, a table of the play lists is recorded in the information file. When a medium (information recording medium) is loaded on a recording/playing apparatus, first, the information file is read, and a menu including titles is displayed according to description information of the information file. A user can select a title on the menu and selectively performs content playing.

The play list file [xxxxx.mpls] recorded on the play list directory [PLAYLIST] is a play list which is installed according to the title viewed by the user and is configured with at least one or more playing path information (play items). Each piece of playing path information (play item) is playing section designation information including a play starting point (IN time point) and a play ending point (OUT time point) with respect to a clip. For example, a plurality of playing path information (play items) of a plurality of play lists is arranged on the time axis, so that a playing order in each play section can be designated.

The clip information file [xxxxx.clpi] recorded in the clip information directory [CLIPINF] is set to be in correspondence with the AV stream file [xxxxx.m2ts] recorded in the stream directory [STREAM]. The clip information file is a file where information on the streams necessary for playing actual streams is written.

The AV stream file [xxxxx.m2ts] recorded in the stream directory [STREAM] is a file where streams including image data coded in various coding methods are stored. Note that, the AV stream file [xxxxx.m2ts] is also called a clip AV stream file. The 3D image data are also stored in the AV stream file (=clip AV stream file).

Note that, in some cases, the clip information file [xxxxx.clpi] recorded in the clip information directory [CLIPINF] and the AV stream file are collectively called a clip.

As described above, the information file through the clip information file are the management information files applied to data playing for the data stored in the clip AV stream file. The management information file has a hierarchical structure where one or more play list files included as a lower level of the information file and one or more clip information files are included as a lower level of the play list file. In other words, a plurality of different management information files are set to be hierarchized. In the configuration according to the present invention, 3D image information is recorded in each of the hierarchized management information files, and during the playing of content from the medium, the 3D image information is sequentially read and used from the hierarchized management information files.

The playing apparatus reads the 3D image information in the order of, for example, the information file, the play list file, and the clip information file and acquires detailed information as to whether or not a 3D image is included in content to be played or 3D image coding mode and uses the information. The process will be described later.

Figure 4:
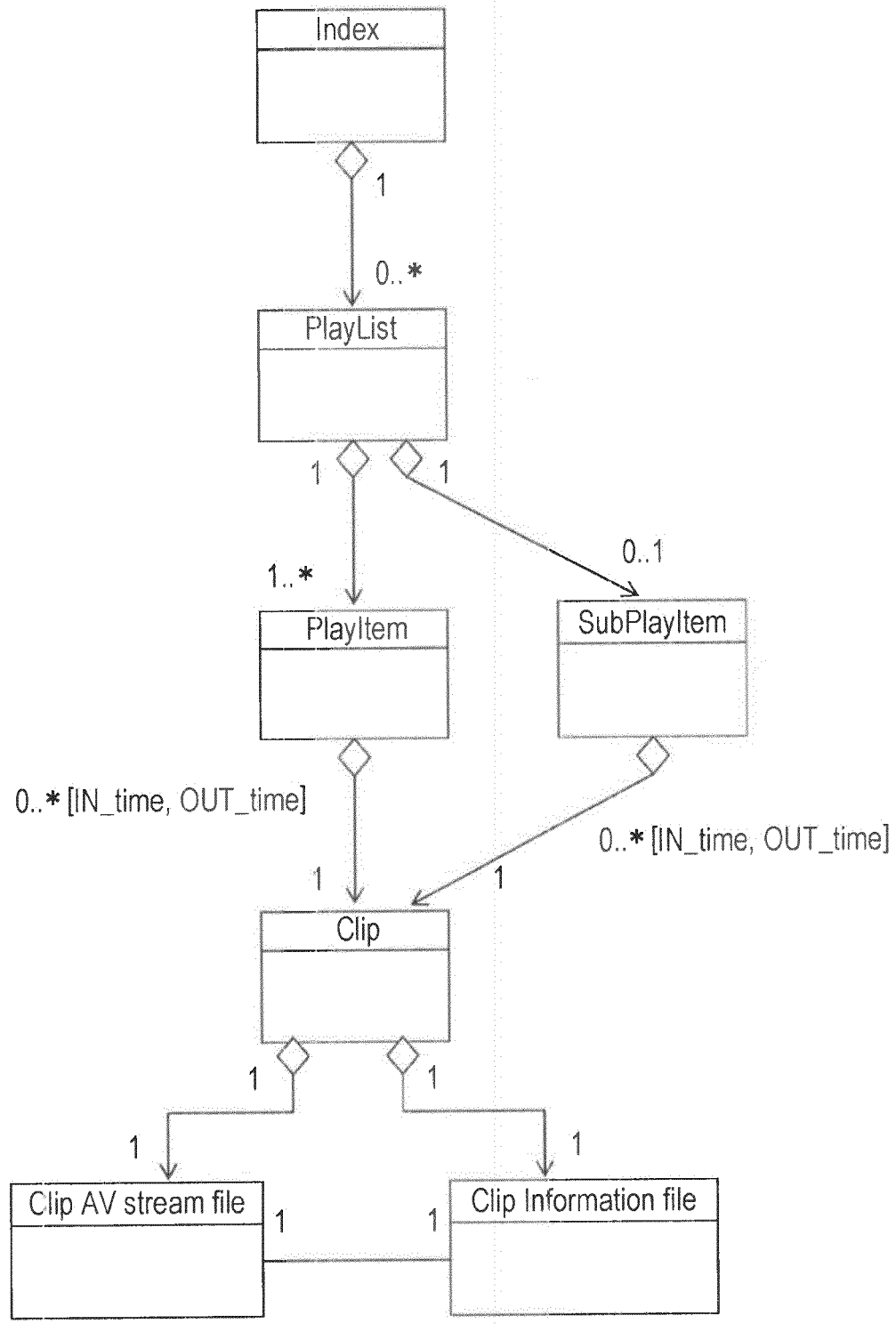
FIG. 4 is a diagram illustrating a data management configuration which is based on a data base file (information file [info.bdav]) to clip information file) which is management information included in a BDAV standard.

A data management configuration based on the data base files (information file through clip information file) which are management information included in the BDAV standard will be described with reference to FIG. 4. FIG. 4 is a UML (Unified Modeling Language) diagram illustrating relationship among a clip AV stream, clip information, a clip, a play item, a play list, and an information file.

Only one information file exists in, for example, a medium such as a disc recording BDAV-adaptive content. First, the playing apparatus can read the information file and display menu information or the like based on a table of the play list files included in the information. A list of the play list or the like corresponding to the content recorded on the disc is presented on the displayed menu, so that the user can designate a title to play the content. Note that actual content data are stored in the clip AV stream file.

The designation information of the user with respect to the menu presented to the user based on the information file is processed to designate a play list (PlayList) or playing path information (play item) in the play list. As described above, the play list includes playing path information (play item) which becomes playing section designation information.

The playing path information (play item) includes two types of paths, as follows.

Main path (main play item (PlayItem))
Sub path (sub play item (SubPlayItem))

Each of the main path (main play item) and the sub path (sub play item) is in correspondence with one individual clip.

The main path (main play item) or the sub path (sub play item) has designation information for a play starting point (IN time) and a play ending point (OUT time). The designation information for the play starting point (IN time) and the play ending point (OUT time) is used as playing section designation information for the content included in the clip AV stream file which is in one-to-one correspondence with the clip.

In this manner, the designation information for a title included in the menu presented to the user based on the information is used as selection information for the play list or the play item, and the playing section is determined according to the play starting point (IN time) and the play ending point (OUT time) set in the selected playing path information (play item). The clip information file and the clip AV stream file as the clip according to the determined playing section are selected, and the playing is performed. By defining the structure illustrated in FIG. 4, a non-destructive playing order designation for playing an arbitrary portion without a change in the clip AV stream file can be performed.

The relationship among a play list, a playing path information (play item) included in the play list, a clip information file designating play starting/ending points according to playing path information (play item), and a clip AV stream file which stores playing content in one-to-one correspondence with the clip information file will be described with reference to FIG. 5.

Figure 5:
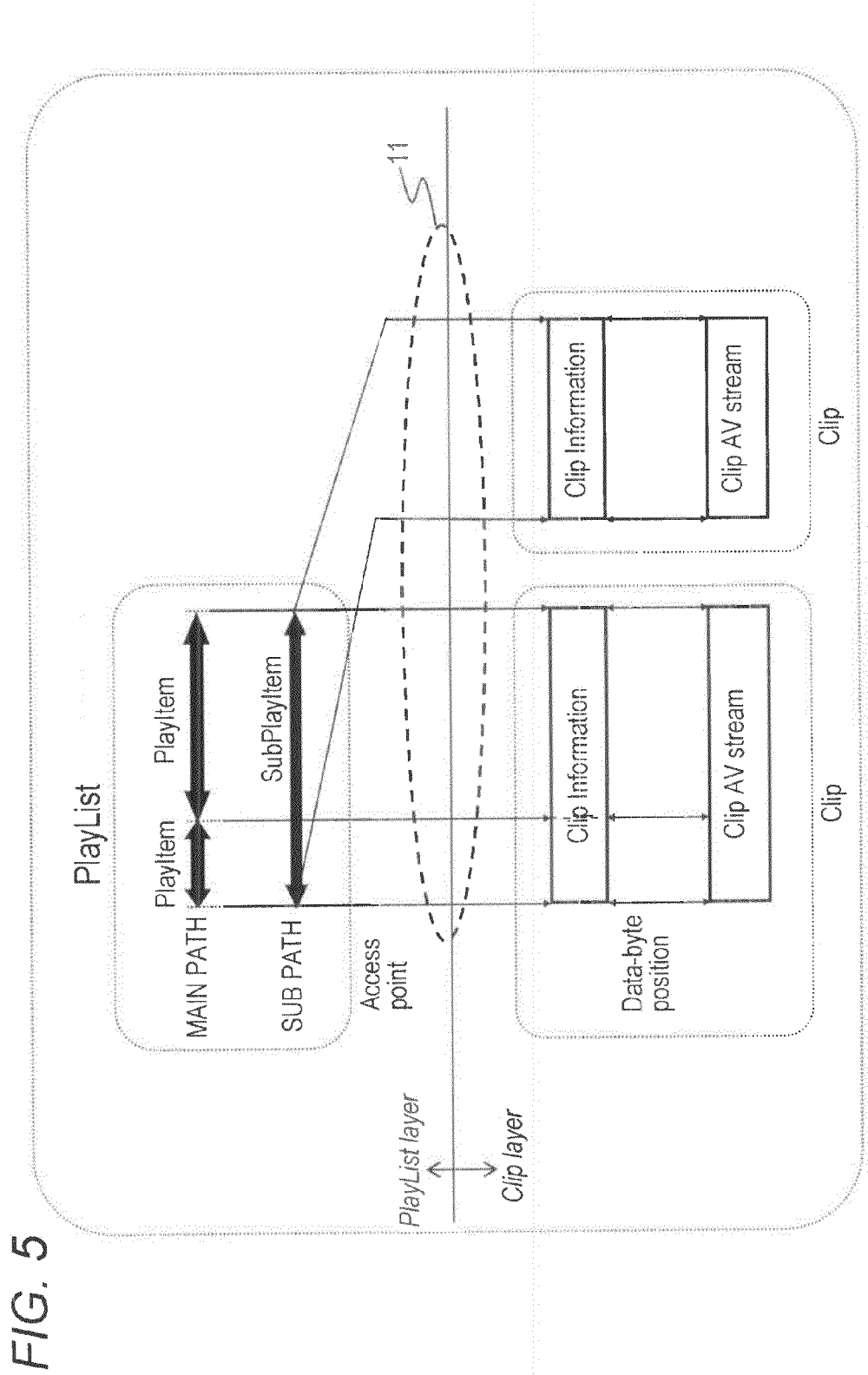
FIG. 5 is a diagram illustrating a correspondence relation between a play list and playing path information (play item) and a correspondence relation between a clip information file and a clip AV stream file.

FIG. 5 illustrates a play list, playing path information (play item) included in the play list, a clip information file designating play starting/ending points according to playing path information (play item), and a clip AV stream file which stores playing content in one-to-one correspondence with the clip information file. Note that, a clip AV stream file (Clip AV stream) and a clip information file (Clip Information) as auxiliary information are considered to be one object, and a set thereof is called a clip.

As described above, the play list includes a main path (main play item (PlayItem)) and a sub path (sub play item (SubPlayItem)). The paths have designation information of a play starting point (IN time) and a play ending point (OUT time). As illustrated in FIG. 5, arrows 11 directing from the main path (main play item (PlayItem)) and the sub path (sub play item (SubPlayItem)) to the clip information files (Clip Information) correspond to the designation information of the play starting point (IN time) and the play ending point (OUT time).

The designation information of the play starting point (IN time) and the play ending point (OUT time) is used as playing section designation information for content included in the clip AV stream file which is in one-to-one correspondence with the clip information file.

[3. Recording Processes for 3D Image Information and Playing Processes Using Recorded 3D Image Information]

Next, a recording process for 3D image information and a playing process using the recorded 3D image information will be described. For example, in many cases of existing data recording/playing standards (formats) such as the above-described BDAV standard, an area for recording attribute information on the 3D image is not defined. Although the 3D image is recorded according to the format, it seams to be recorded as a 2D image, and during the playing, it is likely to be played as a general 2D image. Hereinafter, a configuration will be described so that, in order to solve this problem, in the case of recording the 3D image in a recording medium, various attribute information including information as to whether or not the recorded image is a 3D image, 3D image coding mode information, and control information applied to 3D image recording or playing is recorded, and during the playing, the attribute information is referred to, so that the 3D image can be correctly played.

In the configuration according to the present invention, the 3D image information which is attribute information for the 3D image is recorded in each of hierarchized management information files. The attribute information in units of the management data of each file is recorded in each management information file. During the playing of content from a medium, 3D image information is sequentially read from the hierarchized management information files, so that the attribute in units of the management data of each management information file can be identified. Therefore, processes of correctly decoding and playing the 3D image in units of data are implemented.

Note that, with respect to the medium recording the 3D image, various media such as BD (Blu-ray Disc (registered trademark)) or a flash memory can be used. The present invention is not limited to a specific recording medium, but may be applied to a recording/playing process using various media.

In addition, hereinafter, although the BDAV standard (format) as a recording/playing format without definition of a recording area for information on the 3D image is described as an example, this is an exemplary one, but the present invention is not limited to the BDAV standard. The present invention can be applied to other standards.

(3-1. Recording Process and Using Process for 3D Image Information Using Management Information File (Database File)

First, in the content recording/playing using discs such as BD (Blu-ray Disc (registered trademark)), a flash memory, or various recording media, a process of recording 3D image information in the management information file (data base file) and a process of using the 3D image information will be described.

As described above, during the content recording on a medium according to the BDAV standard, content as actual data are stored to be recorded in an AV stream file. In addition, a management information file (data base file) is recorded as management information on the recording content. The management information file (data base file) includes the following files.

(a) information file [info.bdav]
(b) play list file
(c) clip information file

Examples described hereinafter are examples of a process of recording 3D image information in the data base file and using the 3D image information during the playing.

(3-1-a. Example of Recording 3D Image Information in Information File)

First, an example of recording the 3D image information in the information file [info.bdav]) will be described.

FIG. 6 illustrates syntax of the information file [info.bdav] which is defined as a management information file (data base file) in the BDAV standard.

Note that, in the hereinafter description, the syntax of various management information defined in the BDAV standard will be described with reference to the figure. The information processing device performing data recording on the medium performs a process of generating the management information configured with syntax hereinafter described during the content recording process and recording the management information. In addition, in the case where the information processing device performs a process of editing recording-completed content or the like to change the recording content, the updating of the management information together with the changing is performed. In addition, the information processing device which performs data playing from the medium where the content is recorded analyzes a coding stream as content to be played according to the syntax and performs a decoding process to generate playing data.

Note that, with respect to the syntax illustrated in each of the figures hereinafter, syntax item (syntax), bit length (No. of bits), and mnemonic indicating a type and a transmission order are illustrated as components from the right side.

The information file [info.bdav] illustrated in FIG. 6 is configured with manly the following three objects, as illustrated in this figure.

UI information [UIAppInfoBDAV( )] 101
play list information [TableOfPlayLists( )] 102
maker private data area [MakersPrivateData( )] 103

The information file [info.bdav] includes designation information for the play list.

Among the above-mentioned information, the UI information [UIAppInfoBDAV( )] 101 is an area where information on the display of the menu information including, for example, content titles or the like is recorded.

The play list information [TableOfPlayLists( )] 102 is an area where play list information for playing content corresponding to the title is recorded.

The maker private data area [MakersPrivateData( )] 103 is an area where, for example, a maker of providing an information processing device such as a player apparatus can freely record information. For example, the maker private data area is set as an area where a maker of a recording/playing apparatus can freely record information or the like for a specific application of each company, which is executed in the recording/playing apparatus. Note that the maker private data area [MakersPrivateData( )] 103 is set so that each maker can individually insert private data.

FIG. 7 illustrates syntax of the maker private data area 103.

As illustrated in FIG. 7, the maker private data area [MakersPrivateData( )] 103 includes the following data recording areas.

maker ID [maker_ID] recording area 111
maker model code [maker_model_code] recording area 112
data block [data_block] recording area 113

First, a general using form of these data recording areas will be described.

The maker ID [maker_ID] recording area 111 is an identification information recording area for a maker which records maker private data.

For example, in the case where an "A" company's recording/playing apparatus performs content recording, so that a parameter applied to an application unique to the "A" company's apparatus is to recorded, a process of recording a set ID of the "A" company and recording the parameter in an actual data recording area for the maker private data is performed.

The maker model code [maker_model_code] recording area 112 is a code of product identification information or the like of the apparatus which records the maker private data.

The data block [data_block] recording area 113 becomes actual data recording area for the maker private data.

In the embodiment, the 3D image information (multiview_video_info) is recorded by using the following data recording areas illustrated in FIG. 7.

maker ID [maker_ID] recording area 111
maker model code [maker_model_code] recording area 112
data block [data_block] recording area 113

Note that a variety of information unique to the maker is recorded in the data block [data_block] recording area 113. As a portion of the variety of information, the 3D image information (multiview_video_info) is recorded.

According to each recording information, three sets of a maker ID [maker_ID], a maker model code [maker_model_code], and a data block [data_block] can be set.

Therefore, in the case where attribute information or control information for the 3D image is recorded in the data block [data_block] recording area 113, first, index information as to whether or not the information recorded in the data block [data_block] recording area 113 is 3D image information (multiview_video_info) is recorded in the following fields.

maker ID [maker_ID] recording area 111
maker model code [maker_model_code] recording area 112 An example of a specific data recording mode is illustrated in FIG. 8.

Identification information as to whether or not the maker private data recorded in the data block are 3D image information is recorded in the maker ID [maker_ID] recording area 111.

For example, as illustrated in FIG. 8, ID information [0x2000] corresponding to the 3D image information (multiview_video_info) defined in advance is recorded in the maker ID [maker_ID] recording area 111 and indicates that the information recorded in the data block hereinafter is 3D image information (multiview_video_info).

In addition, version information of the 3D image information recorded in the data block is recorded in the maker model code [maker_model_code] recording area 112. In the example illustrated in FIG. 8, [0x0100] is the version information of the 3D image information.

A specific example of the 3D image information (multiview_video_info) recorded in the data block [data_block] recording area 113 illustrated in FIG. 7 is illustrated in FIG. 9.

As illustrated in FIG. 9, the flag information [Index_multiview_video_flag] 115 is recorded in the 3D image information (multiview_video_info).

The flag information 115 is a flag setting the information as to whether or not a 3D image is included in the setting content (content to be managed according to the information file) under the BDAV directory in the content recorded in the medium.

A specific example of the flag information 115 is illustrated in FIG. 10.

Value of Flag=0: only 2D content is included under the directory to be managed, but 3D content is not included.

Value of Flag=1: 3D content is likely to be included under the directory to be managed.

In this manner, information of any one of Flag=0/1 is set. In the case where the value of flag is 0, only the 2D content is included under the directory to be managed, and 3D content is not included. In the case where the value of flag is 1, 3D content is likely to be included under the directory to be managed.

The information is configured so as to be determined.

Since the flag information is included in the information file, for example, in the case where the playing apparatus performs menu display including content title stored in the medium by using the information file, the playing apparatus can present to the user the information as to whether or not the 3D image is included in the content corresponding to each title based on the flag information.

For example, the following menu display can be performed.

Title A: 3D image is included.
Title B: 2D image.
Title C: 3D image is included.

Note that, in the case where a 3D image is included in the recording content, an apparatus performing content recording sets the flag=1; and in the case where a 3D image is not included in the recording content, the apparatus performing content generates an information file where the flag=0 is set and records the information file. Note that, next, in the case where editing or removing of the recorded data is performed, an updating process of checking a clip and setting the value of flag to 0 is performed if the 3D content do not exist.

(3-1-b. Example of Recording 3D Image Information in Play List File)

Next, an example of recording the 3D image information in the play list file will be described. In the above example, an example of recording the 3D image information in the maker private data area of the information file [info.bdav] was described.

As described before with reference to FIGS. 4 and 5, the play list file is a file storing the play list selected corresponding to the title selected from the title display menu using the information file [info.bdav]. As described with reference to FIG. 5, the playing path information (play item) including the playing section designation information having the play starting point (IN time point) and the play ending point (OUT time point) with respect to the clip is stored in the play list.

A plurality of the play list files which are in correspondence with a plurality of the titles exist in the medium. Similarly to the information file [info.bdav], a maker private data area is set in each of the play list files. In other words, the maker private data area is, for example, an area where a maker of providing an information processing device such as a recording/playing apparatus can freely record information.

This example is an example of recording the 3D image information (multiview_video_info) in the maker private data area of the play list file.

Note that, similarly to the information file illustrated in FIG. 7, the following data recording areas are set in the maker private data area of the play list file.

maker ID [maker_ID] recording area
maker model code [maker_model_code] recording area
data block [data_block] recording area In the case where the 3D image information (multiview_video_info) is recorded in the maker private data area of the play list file, the identification information as to whether or not the data recorded in the data block are 3D image information is recorded in the maker ID recording area of the play list file. Similarly, the version information of the 3D image information recorded in the data block is recorded in the maker model code [maker_model_code] recording area of the play list file. The configurations are the same as the recording configuration of the case of the information file described with reference to FIG. 8.

Next, a specific example of the 3D image information (multiview_video_info) recorded in the data block [data_block] recording area in the maker private data area of the play list file will be described with reference to FIG. 11.

As illustrated in FIG. 11, the following information is recorded in the data block [data_block] recording area in the maker private data area of the play list file.

3D image flag [PlayList_multiview_video_flag] 121
3D image configuration information [PlayList_multiview_video_configuration] 122
frame 0 image identification flag [PlayList_frame0_is_Left_flag] 123
base image identification flag [PlayList_base_view_is_Left_flag] 124
main path image identification flag [PlayList_MainPath_is_Left_flag] 125
coding mode identification flag [PlayList_use_entropy_coding_mode_flag] 126
inter-image reference identification flag [PlayList_use_inter-view_prediction_flag] 127

The aforementioned information is the 3D image information recorded in each of the play list files.

The aforementioned information is the management information for the content to be played designated by each play list and is the information set corresponding to the content in the playing designation section regulated according to the playing path information (play item) included in the play list file.

Therefore, different information is recorded in a play list file corresponding to different content to be played.

An apparatus performing content recording determines whether or not a 3D image is included in the recording content and records the 3D image information illustrated in FIG. 11 in the data block [data_block] recording area in the maker private data area of the play list file according to the determination information.

An apparatus performing content playing can correctly perform 3D image playing by applying the information recorded in the play list file.

Detailed examples of the information recorded in the data block [data_block] recording area in the maker private data area illustrated in FIG. 11 will be described with reference to FIG. 12 and the following figures. (3D Image Flag [PlayList_multiview_video_flag] 121)

First, a specific example of the 3D image flag 121 will be described with reference to FIG. 12.

The 3D image flag 121 is 3D image identification data indicating whether a 3D image is likely to be included in the data to be managed of the play list. As illustrated in FIG. 12, information of any one of the flag=0/1 is recorded.

Value of 3D image flag=0: only 2D content is included in the content to be played of the play list, but 3D content is not included.

Value of 3D image flag=1: 3D content is likely to be included in the content to be played of the play list.

Note that, in the example, although it is described as an example that the 3D image information is not included in units of a playing path (play item) included in the play list, the 3D image information set for each program sequence (program_sequence) of the later-described clip information file can be used as information in units of a play item which is a lower level division of the play list.

In addition, with respect to the recording content corresponding to one play list, a 2D image and a 3D image are likely to be mixed in units of a play item. In this case, the flag setting is as follows.

Value of 3D image flag=1: 3D content is likely to be included in the content to be played of the play list An apparatus performing content recording determines whether or not a 3D image is included in the recording content and records the aforementioned flag according to the determination information.

An apparatus performing content playing can identify whether or not the 3D image is included in the content played by using the play list with reference to the value of the flag. (3D Image Configuration Information [PlayList_multiview_video_configuration] 122)

Next, a specific example of the 3D image configuration information 122 will be described with reference to FIG. 13.

The 3D image configuration information 122 is set as an area of setting coding mode information for a 3D image which is content played according to the play list.

More specifically, as illustrated in FIG. 13, the coding configuration information is recorded as the following setting.

Value=3: side-by-side method (side by side)
Value=4: top-and-bottom method (top and bottom)
Value=5: frame sequential method (frame sequential)
Value=30: MVC coding 2-elementary stream/1-system stream (1-clip AV stream)
Value=31: MVC coding 2-elementary stream/2-system stream (2-clip AV stream)
Value=32: MVC coding 1-elementary stream/1-system stream (1-clip AV stream)
Value=40: independent 2-elementary stream/1-system stream (1-clip AV stream) (not MVC coding)
Value=41: independent 2-elementary stream/2-system stream (2-clip AV stream) (not MVC coding)

Note that, in the case where a type of the 3D content in the play list cannot be identified, or in the case where types of the 3D content mixedly exist in the play list, the value is set to 20 (no information).

The side-by-side method of Value=3 corresponds to the coding method illustrated in FIG. 1 (1).

The top-and-bottom method of Value=4 corresponds to the coding method illustrated in FIG. 1 (2).

The frame sequential method of Value=5 corresponds to the coding method illustrated in FIG. 1 (3).

The MVC coding method of Value=30 to 32 corresponds to the coding method illustrated in FIG. 2 (4).

In this case, the elementary stream is classified as 1 or 2, and the system stream is classified as 1 or 2.

The coding method of Value=40 to 41 corresponds to the coding method illustrated in FIG. 2 (5).

In this case, the elementary stream is classified as 2, and the system stream is classified as 1 or 2.

In the case where the 3D image is included in the recording content, an apparatus performing content recording records the above value according to the coding mode information.

An apparatus performing content playing identifies the coding mode of the content which is to be played by using the play list with reference to the above value and performs a decoding process corresponding to the identification information.
(Frame 0 Image Identification Flag [PlayList_frame0_is_Left_flag] 123)

Next, a specific example of the frame 0 image identification flag 123 will be described with reference to FIG. 14.

The frame 0 image identification flag 123 is information which is recorded in the case where the 3D image coding method is the frame sequential method (refer to FIG. 1 (3)) and is used during the playing. In other words, the frame 0 image identification flag 123 is used for the case of the setting of (3D image configuration information)=5 described with reference to FIG. 13.

As illustrated in FIG. 1 (3), in the case of the frame sequential method, the left-eye images (L images) and the right-eye images (R images) are set as alternating frames.

For example, in one combination, the frame 0 is set to the left-eye image (L image), and the frame 1 is set to the right-eye image (R image), or in the other combination, the frame 0 is set to the right-eye image (R image), and the frame 1 is set to the left-eye image (L image).

During the playing, for example, the L images and the R images are alternately displayed on a display apparatus, and for example, opening and closing of the shutter of shutter-type glasses which a user wears are performed in coincidence with the display.

According to this process, the L images are observed by only the left eye of the user, and the R images are observed by only the right eye, so that a correct depth effect can be obtained.

However, if mistake occurs in the L and R images, a displaying process may be performed with a completely reverse setting, so that a right-eye portion of shutter-type glasses is opened at the timing when the L image is displayed on a display unit, and a left-eye portion of the shutter-type glasses is opened at the timing when the R image is displayed on the display unit. If such a display control is performed, a 3D image with a correct stereoscopic effect cannot be observed.

The information for preventing the occurrence of this problem is the frame 0 image identification flag 123 illustrated in FIG. 14. In other words, the frame 0 image identification flag 123 is an area where information indicating whether the frame 0 is the left-eye image (L image) or the right-eye image (R image) is recorded.

More specifically, for example, as illustrated in FIG. 14, the following information is recorded.

Value=2: the frame 0 corresponds to the right-eye image (R image)
Value=3: the frame 0 corresponds to the left-eye image (L image)

Note that, in the case where the correspondence between the frame 0 and the L and the correspondence between the frame 0 and the R mixedly exist in the play list, or in the case where information of the correspondence cannot be acquired, the value is set to 0 (no information).

In the case where a 3D image is included in the recording content and the coding mode thereof is a frame sequential method, an apparatus performing content recording records the aforementioned value according to the frame information.

During the decoding process for the content played by using the play list, an apparatus performing content playing correctly determines whether the frame 0 is an L image or an R image with reference to the aforementioned value and can correctly perform playing and displaying of the L and R images.

(Base Image Identification Flag [PlayList_base_view_is_Left_flag] 124)

Next, a specific example of the base image identification flag 124 will be described with reference to FIG. 15.

The base image identification flag 124 is information which is recorded in the case where the 3D image coding method is the MVC coding method (refer to FIG. 2 (4)) and is used during the playing. In other words, the base image identification flag 124 is used for the case of the setting of (3D image configuration information)=30 to 33 described with reference to FIG. 13.

In the MVC coding method described with reference to FIG. 2 (4), in some cases, the coding process with reference between the L image and the R image may be performed. In the case where the coding according to the inter-view reference is performed, any one of the L and R images is set as a base view (base image), and the other image is decoded by referring to the base view.

The base image identification flag 124 has a value indicating whether the base view is the L image or the R image. More specifically, for example, as illustrated in FIG. 15, the following information is recorded.

Value=2: the base view is the right-eye image (R image)
Value=3: the base view is the left-eye image (L image)

Note that, in the case where the correspondence between the base view and the L and the correspondence between the base view and the R mixedly exist in the play list, or in the case where information of the correspondence cannot be acquired, the value is set to 0 (no information).

In the case where a 3D image is included in the recording content and the coding mode thereof is an MVC coding method (refer to FIG. 2 (4)), an apparatus performing content recording records the aforementioned value according to the base view information.

During the decoding process for the content played by using the play list, an apparatus performing content playing determines whether the base view is an L image or an R image with reference to the aforementioned value and can correctly decode and display the L and R images.

(Main Path Image Identification Flag [PlayList_MainPath_is_Left_flag] 125)

Next, a specific example of the main path image identification flag 125 will be described with reference to FIG. 16.

In the main path image identification flag 125, recorded is a flag used in the coding method described with reference to FIG. 2 (5), that is, the coding method [non-inter-view reference independent stream (2 stream) (not MVC)], in the case of the independent 2-elementary stream/2-system stream (2-clip AV stream).

More specifically, the main path image identification flag 125 is used in the case of the setting of (3D image configuration information)=41: independent 2-elementary stream/2-system stream (2-clip AV stream) described with reference to FIG. 13.

In the main path image identification flag 125, recorded is information indicating which one of the L and R images each of the following two paths corresponds to. The two paths set in the play list are as follows.

main path (main play item)
sub path (sub play item)

More specifically, for example, as illustrated in FIG. 16, the following information is recorded.

Value=2: The main path corresponds to the right-eye image (R image)
Value=3: The main path corresponds to the left-eye image (L image)

Note that, in the case where the correspondence between the main path and the L image and the correspondence between the main path and the R image mixedly exist in the play list, or in the case where information of the correspondence cannot be acquired, the value is set to 0 (no information).

In the case where a 3D image is included in the recording content and the coding mode thereof is (3D image configuration information)=41: independent 2-elementary stream/2-system stream (2-clip AV stream) described with reference to FIG. 13, an apparatus performing content recording records the aforementioned value according to the setting of the produced or updated play list.

During the decoding process for the content played by using the play list, an apparatus performing content playing correctly determines which one of the L and R images each of the main path and the sub path is a playing path of, with reference to the aforementioned value, and can correctly decode and display the L and R images.

The using form of the main path and the sub path will be described with reference to FIG. 17.

Figure 17:
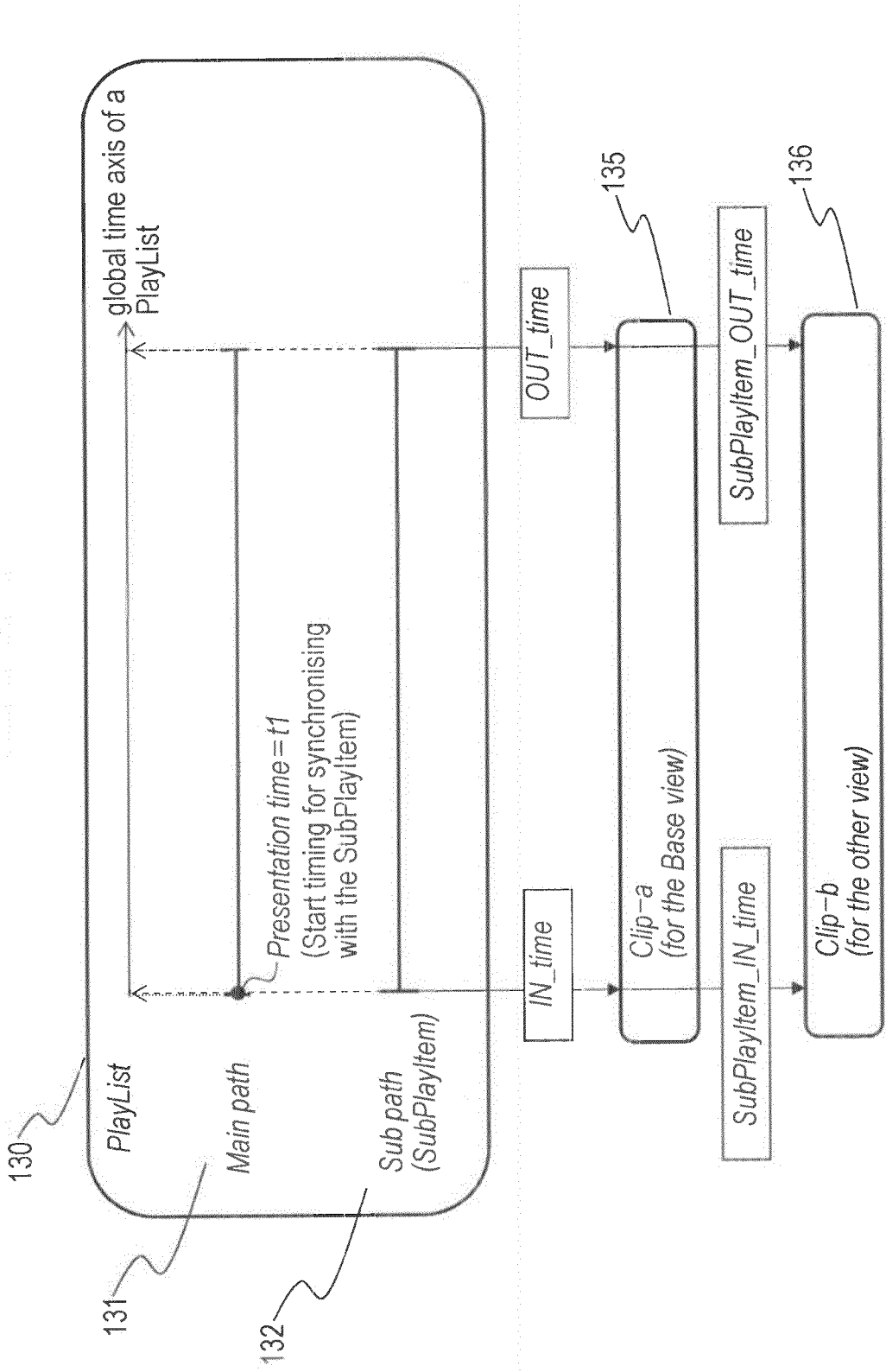
FIG. 17 is a diagram illustrating a using form of a main path and a sub path.

One play list 130 is illustrated in FIG. 17. The play list 130 includes the following paths.

main path (main play item) 131
sub path (sub play item) 132

The main path (main play item) 131 retains the play starting point (IN_time) and the play ending point (OUT_time) of a clip-a 135 to play an AV stream which is in correspondence with the clip-a 135.

The sub path (sub play item) 132 retains the play starting point (IN_time) and the play ending point (OUT_time) of a clip-b 136 to play an AV stream which is in correspondence with the clip-b 136.

In the case of the setting, there are two patterns as a pattern as to which one of the L and R images each of the main path and the sub path corresponds to, as follows.

(a) Pattern 1
The clip designated by the main path is an L image playing clip
The clip designated by the sub path is an R image playing clip (b) Pattern 2
The clip designated by the main path is an R image playing clip
The clip designated by the sub path is an L image playing clip There is the Pattern 1 or the Pattern 2.

According to the setting, 3D image playing can be performed by using the L and R images and the main path (main play item) 131 and the sub path (sub play item) 132 in one play list.

However, if the playing apparatus cannot identify which one of the L and R images each of the main path and the sub path corresponds to, the playing apparatus cannot correctly perform the 3D image displaying. The main path image identification flag 125 illustrated in FIG. 16 is a flag indicating whether the main path corresponds to the L image or the R image. The playing apparatus can correctly decode and display the L and R images with reference to the information.
(Coding Mode Identification Flag [PlayList_use_entropy_coding_mode_flag] 126)

Next, a specific example of the coding mode identification flag 126 will be described with reference to FIG. 18.

In the coding mode identification flag 126, recorded is a flag used in the coding method with reference to FIG. 2 (4), that is, the coding method [inter-view reference stream (MVC)].

More specifically, the coding mode identification flag 126 is used for the case of the setting of (3D image configuration information)=30 to 32 described with reference to FIG. 13.

The coding mode identification flag 126 is an identification flag indicating whether or not the coding process using the entropy coding mode is performed as a coding process.

Note that, more specifically, the coding process using the entropy coding mode is, for example, a coding process using CABAC (Context-based Adaptive Binary Arithmetic Coding).

More specifically, the coding process using no entropy coding mode is, for example, a coding process using CAVLC (Context-based Adaptive Variable Length Coding).

More specifically, for example, as illustrated in FIG. 18, the following information is recorded.

Value=1: the entropy coding mode is not used
Value=2: the entropy coding mode is likely to be used
Note that, in the case where the information on the video stream to be played cannot be acquired from the play list, the value is set to 0 (no information).

In the case where a 3D image is included in the recording content and the coding mode thereof is an MVC coding method (refer to FIG. 2 (4)), an apparatus performing content recording records the aforementioned value according to whether or not the coding process uses the entropy coding mode.

During the decoding process for the content played by using the play list, an apparatus performing content playing identifies the coding mode with reference to the aforementioned value and can correctly decode and display the L and R images.

Note that, for example, in some cases, the playing apparatus may be an apparatus which cannot decode the CAVLC coding data in the entropy coding mode. In this case, the decoding and playing processes for the 3D image are stopped, and the process of playing a 2D image by playing only the L images or only the R images can be performed based on the setting information of the coding mode identification flag 126. If the flag does not exist, the playing apparatus cannot identify whether or not the coding is made in the coding mode in which the playing apparatus can perform the playing, so that the playing apparatus starts the decoding process. As a result, processing error occurs.
(Inter-Image Reference Identification Flag [PlayList_use_inter_view_prediction_flag] 127)

Next, the inter-image reference identification flag [PlayList_use_inter-view_prediction_flag] 127 will be described with reference to FIG. 19.

In the inter-image reference identification flag 127, recorded is a flag used in the coding method described with reference to FIG. 2 (4), that is, the coding method [inter-view reference stream (MVC)].

More specifically, the inter-image reference identification flag 127 is used for the case of the setting of (3D image configuration information)=30 to 32 described with reference to FIG. 13.

The inter-image reference identification flag 127 is information indicating whether or not the coding with the inter-view reference being performed is performed in the case of the setting of (3D image configuration information)=30 to 32 described with reference to FIG. 13. Even in the coding process according to the setting of the coding method described with reference to FIG. 2 (4), that is, [inter-view reference stream (MVC)], in some cases, actually, the reference process between the L image and the R image may not be performed.

More specifically, the coding data used as content to be played in one play list include:

Only the coding data with no reference between the L image and the R image; and
the coding data with reference between the L image and the R image.

A flag which can identify the two types of the data is set as the inter-image reference identification flag 127.

More specifically, for example, as illustrated in FIG. 19, the following information is set.

Value=1: non-inter-view reference
Value=2: inter-view reference is likely to be included
Note that, in the case where information on the video stream to be played cannot be acquired from the play list, the value is set to 0 (no information).

In the case where a 3D image is included in the recording content and the coding mode thereof is an MVC coding method (refer to FIG. 2 (4)), an apparatus performing content recording records the aforementioned value according to whether or not the inter-view reference is performed in the coding process.

During the decoding process for the content played by using the play list, an apparatus performing content playing identifies the coding mode with reference to the aforementioned value and can correctly decode and display the L and R images.
(3-1-c. Example of Recording 3D Image Information in Play Path Information (Sub Play Item Information) of Play List File)

Next, an example of recording the 3D image information in the playing path information (sub play item information) of the play list file will be described.

FIG. 20 illustrates syntax of the play list file. As described before with reference to FIGS. 4 and 5, the play list file is a file storing the play list selected corresponding to the title selected from the title display menu using the information file. As described with reference to FIG. 5, the playing path information (play item) including the playing section designation information having the play starting point (IN time point) and the play ending point (OUT time point) with respect to the clip is stored in the play list.

Two types of paths exist in the playing path information (play item) as follows.

main path (main play item (PlayItem))
sub path (sub play item (SubPlayItem))

Each of the main path (main play item) and the sub path (sub play item) is individually in correspondence with one clip.

In the case where the 3D image coding mode is (3D image configuration information)=41: independent 2-elementary stream/2-system stream (2-clip AV stream) described with reference to FIG. 13, as described with reference to FIGS. 16 and 17, each of the main path (play item) and the sub path (sub play item) included in the play list is set as the playing path of the L and R images.

In other words, the images are recorded in the setting of the following Pattern 1 or 2.

(a) Pattern 1

The clip designated by the main path is an L image playing clip

The clip designated by the sub path is an R image playing clip (b) Pattern 2

The clip designated by the main path is an R image playing clip

The clip designated by the sub path is an L image playing clip

As described before with reference to FIGS. 13 and 16, the information indicating which one of the settings the recording is performed according to is recorded in the main path image identification flag [PlayList_MainPath_is_Left_flag] 125, and during the playing, the setting can be identified with reference to the flag.

However, for example, in the case where an image photographed by using a video camera is to be recorded in a medium, a combination of the main path (play item) and the sub path (sub play item) set in the play list may not be a combination of L and R images constituting a 3D image.

For example, in some case, the following setting may be made.

The main path (play item) is set as a playing path for general 2D image data

The sub path (sub play item) is set as a playing path for after-recording audio data Besides, as a using form of the main path and the sub path, a combination of the following paths can be set.

Image playing paths for a wide image and a telescopic image

Image playing paths for a whole view image and a partially enlarged image

Two image playing paths for images having different focus positions

A combination of the playing paths of the different images can be set.

In this manner, although the main path (play item) is used as playing path information for main image data, the using form of the sub path (sub play item) has various forms. Therefore, during the playing, it is necessary to determine the using form of the sub path so as to perform playing.

Therefore, the 3D image information is recorded in the playing path information (sub play item information) of the play list file.

Areas where unique information of the main path (play item) and the sub path (sub play item) included in the play list is recorded are set in the syntax of the play list file illustrated in FIG. 20.

main path (play item) information recording area 141
sub path (sub play item) information recording area 142

The information recording areas are set.

The detailed syntax of the recorded data in the sub path (sub play item) information recording area 142 illustrated in FIG. 21. As illustrated in FIG. 21, a sub path (sub play item) type information recording area 145 is set in the sub path (sub play item) information recording area 142.

In the processing example, a sub path using type identification value identifying whether or not the sub path (sub play item) is a sub path (sub play item) for playing any one of the L and R images constituting a 3D image is set in the sub path (sub play item) type information recording area 145. For example, the sub path using type identification value is one of the values illustrated in FIG. 22.

In the example illustrated in FIG. 22, the setting of the sub path using type identification values is as follows.

Value=1: playing path for audio stream

Value=2: playing path for one image of constituent images (L and R images) of the 3D image This value is set.

In the case where a 3D image is included in the recording content and the 3D image uses each of the main path (play item) and the sub path (sub play item) in one play list as the playing path of the L and R images, an apparatus performing content recording records the aforementioned value (2).

During the decoding process for the content played by using the play list, an apparatus performing content playing identifies whether the sub path is a playing path of one image of the L and R images constituting the 3D image with reference to the aforementioned value and can correctly decode and display the L and R images.

Note that, in the BDAV, only one sub path (sub play item) can be added to the main path (play item) in one play list. The sub path (sub play item) can be set in the entire of or a portion of the time axis of the main path (play item). At this time, the sub path (sub play item) may be set in such a form that it exceeds boundaries of a plurality of the play items in the main path.

(3-1-d. Example of Recording 3D Image Information in Clip Information File)

Next, an example of recording the 3D image information in the clip information file will be described.

As described before with reference to FIG. 3 or the like, the clip information file [xxxxx.clpi] recorded in the clip information directory [CLIPINF] is set to be in one-to-one correspondence with the AV stream file [xxxxx.m2ts] recorded in the stream directory [STREAM]. The clip information file is a file where information on the streams necessary for playing actual streams is written.

The example of recording the 3D image information in the information file and the maker private data area of the play list file was described before.

Similarly to the play list file or the information file, a maker private data area is set in the clip information file. In other words, the maker private data area is an area where, for example, a maker of providing an information processing device such as a recording/playing apparatus can freely record information.

This example is an example of recording the 3D image information (multiview_video_info) in the maker private data area of the clip information file.

FIG. 23 illustrates syntax of the clip information file. As illustrated in FIG. 23, the clip information file is configured with six objects. The objects are as follows.

ClipInfo( ) 201
SequenceInfo( ) 202
ProgramInfo( ) 203
CPI( ) 204
ClipMark( ) 205
MakersPrivateData( ) 206

An attribute information of the AV stream file corresponding to the clip information file is recorded in the ClipInfo( ) 201.

The SequenceInfo( ) 202 will be described.

In an MPEG-2 transport stream, a time section where a discontinuity point in STC (System Time Clock (reference time)) (system-time-based discontinuity point) is not included is referred to as an STC_sequence. In a clip, the STC_sequence is specified by a value of stc_id. The same value of STC does not occur in the same STC_sequence. Therefore, the same value of PTS (Presentation Time Stamp (time information for synchroncus playing)) does not occur in the same STC_sequence. In the case where the AV stream includes N (N>0) STC discontinuity points, the system time base of the clip is divided into (N+1) STC_sequences.

An address of the site where the discontinuity of STC (system-time-based discontinuity) occurs is recorded in the SequenceInfo.

Figure 24:
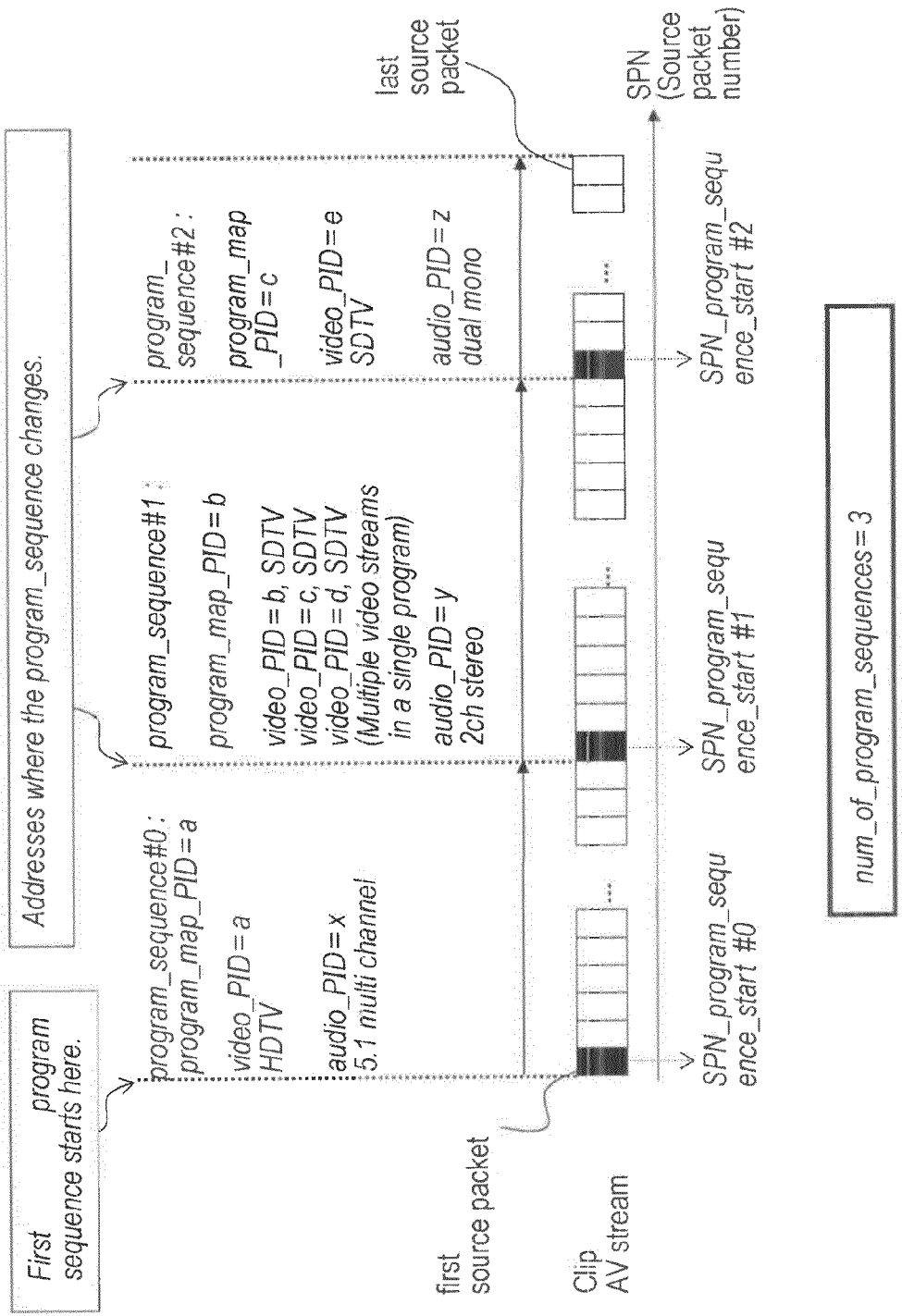
FIG. 24 is a diagram illustrating ProgramInfo of a clip information file and a program sequence (program_sequence).

The ProgramInfo( ) 203 will be described with reference to FIG. 24. The ProgramInfo( ) 203 is a playing section or a time section where playing is performed according to the clip information file. The playing section having the following features is referred to as a program sequence (program_sequence).

The value of PCR_PID (Program Clock Reference Packet ID) is not changed.

The number of video elementary streams is not changed.

The value of PID with respect to each of video streams and the coding information defined by the VideoCodingInfo are not changed.

The number of audio elementary streams is not changed.

The value of PID with respect to each of audio streams and the coding information defined by the AudioCodingInfo are not changed.

The program sequence (program sequence) has only one system time base at the same time point and has only one PMT (Program Map Table) at the same time point.

The transport stream (TS) constituting MPEG includes a plurality of programs, and a plurality of table information indicating relationship between the program included in the stream and program components such as video or audio streams constituting the program is regulated. The table information is called PSI (Program Specific Information) and includes a plurality of tables such as PAT (Program Association Table) or PMT (Program Map Table). The PID of PMT corresponding to the program number or the like is described in the PAT, and PIDs of video, audio, auxiliary data and PCR included in the corresponding program are described in the PMT. TS packets constituting a target program can be extracted from the stream by referring to the PAT and the PMT.

An address of the site where the program sequence (program sequence) is started is recorded in the ProgramInfo( ). The SPN_program_sequence_start represents the address. The SPN denotes a source packet number.

Note that, the boundary of the program sequence (program_sequence) is not always coincident with the boundary of the STC_sequence. In addition, although the play starting point (IN_time) and the play ending point (OUT_time) of the play item (PlayItem) need to be located on the same STC_sequence, the program sequence (program sequence) has no such a limitation.

In other words, in general, in some cases, a play starting point (IN_time) and a play ending point (OUT_time) of a play item (PlayItem) may exist on different program sequences (program_sequence).

FIG. 25 is a diagram illustrating syntax of the ProgramInfo.

The num_of_program_sequences indicates the number of program sequences (program_sequence) in a clip information file.

The SPN_program_sequence_start[i] indicates a relative address of a site where a program sequence is started on an AV stream file.

The program_map_PID[i] indicates a PID of a PMT effective in a program sequence (program_sequence). The num_of_streams_in_ps[i] indicates the number of streams existing in a program sequence (program_sequence).

The num_of_groups[i] indicates the number of combinations of streams when a program sequence (program_sequence) is played.

Next, in the syntax illustrated in FIG. 23, a CPI (Characteristic Point Information) 204 will be described. FIG. 26 is a diagram illustrating the syntax of the CPI.

Data for the mapping between the time information in the AV stream and the address in the file are recorded in the CPI. More specifically, an entry point map (EP map (EP_map)) 210 is recorded.

Figure 27:
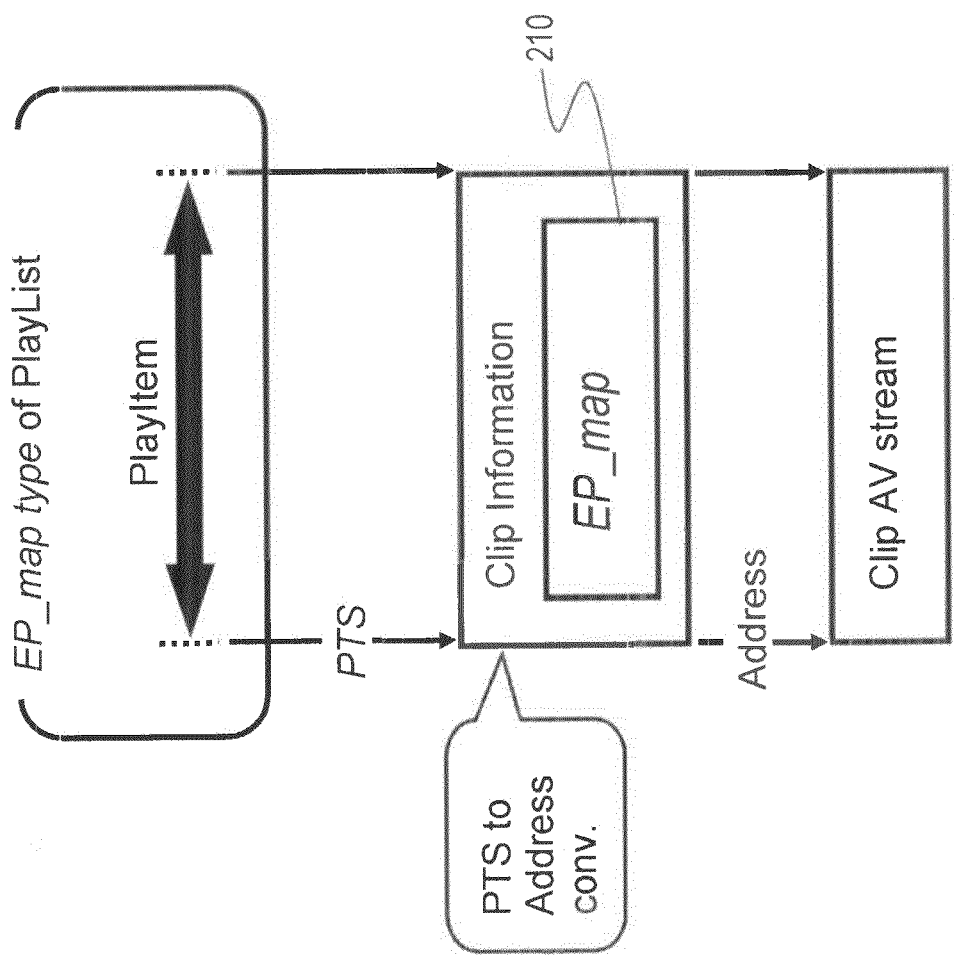
FIG. 27 is a diagram illustrating an EP map recorded in CPI of a clip information file.

The EP map 210 will be described with reference to FIGS. 27 and 28. As illustrated in FIG. 27, the EP map (EP_map) 210 is data included in the clip information file. The EP map includes detection information of an I-picture position as reference data of the MPEG data which becomes, for example, a random access rewritable point (entry point). The process of detecting the I-picture position will be described with reference to FIG. 28. FIG. 28(A) illustrates a clip AV stream, and each rectangle represents a 192-bite source packet. In each source packet, a time stamp is set, and a playing processing time is regulated.

FIG. 28(B) illustrates a detailed configuration of the source packet No. (X1 ). One source packet is configured with a TP_extra header and a transport packet. The transport packet is configured with various header information and data of I-PICH~ as an actual object of the MPEG data.

As described above, the EP map is included in the clip information file illustrated in FIG. 28(C). As illustrated in the figure, various data of [PTS_EP_start], [SPN_EP_start], and [I_end_position_offset] are included in the EP map. The meaning of each of data as follows.

PTS_EP_start: time stamp (presentation time stamp) corresponding to a source packet including a sequence header.

SPN_EP_start: First address of a source packet including a sequence header.

I_end_position_offset: Offset of a source packet including the end of I-picture from a source packet including a sequence header.

The relationship between the data is illustrated in FIG. 28 (D).

In other words, as illustrated in FIG. 28(B), a configuration of the data including the source packet is regulated.
Each of the data [PTS_EP start], [SPN_EP start], and [I_end_position_offset] illustrated in FIG. 28(C) is obtained from the EP map, and the I-Picture position in the source packet is obtained based on the data. The playing apparatus obtains the I-picture position from the EP map, so that the playing process can be performed from an arbitrary position.

Next, in the syntax illustrated in FIG. 23, a ClipMark 205 will be described.

The ClipMark 205 is mark information with respect to a clip and is stored in the ClipMark. The mark is set by a player (recording/playing apparatus 1), but it is not set by a user.

Next, in the syntax illustrated in FIG. 23, a MakersPrivate-Data( ) 206 will be described.

Similarly to the play list file or the information file, a maker private data area is set in the clip information file. In other words, the maker private data area is, for example, an area where a maker of providing an information processing device such as a recording/playing apparatus can freely record information.

This example is an example of recording the 3D image information (multiview_video_info) in the maker private data area of the clip information file.

Note that, similarly to the information file illustrated in FIG. 7, the following data recording areas are set in the maker private data area of the clip information file.

maker ID [maker_ID] recording area
maker model code [maker_model_code] recording area
data block [data_block] recording area In the case where the 3D image information (multiview_video_info) is recorded in the maker private data area of the clip information file, the identification information as to whether or not the data recorded in the data block are 3D image information is recorded in the maker ID recording area of the clip information file. Similarly, the version information of the 3D image information recorded in the data block is recorded in the maker model code [maker_model_code] recording area of the clip information file. The configurations are the same as the recording configuration of the case of the information file described with reference to FIG. 8.

A specific example of the 3D image information (multiview_video_info) recorded in the data block [data_block] recording area of the maker private data area of the clip information file will be described with reference to FIG. 29.

As illustrated in FIG. 29, for example, the following information is recorded in the data block [data_block] recording area in the maker private data area of the clip information file.

number of program sequences (number_of_program_sequences) 220
3D image flag [ClipInfo_multiview_video_flag] 221
3D image configuration information [ClipInfo_multiview_video_configuration] 222
frame 0 image identification flag [ClipInfo_frame0_is_Left_flag] 223
base image identification flag [ClipInfo_base_view_is_Left_flag] 224
clip-adaptive image identification flag [ClipInfo_this_clip_is_Left_flag] 225
coding mode identification flag [ClipInfo_use_entropy_coding_mode_flag] 226
inter-image reference identification flag [ClipInfo_use_inter-view_prediction_flag] 227

The information is recorded in each of the clip information files.

The number of program sequences (number_of_program sequences) 220 is the number of program sequences included in a clip information file. One or more program sequences are included in the clip information file. As described before with reference to FIG. 24 and the like, the program sequence corresponds to a divided playing section of the entire playing section of the AV stream file, which is in one-to-one correspondence with the clip information file, as a content playing time section where there is no large change in a process such as no change in the number of video elementary streams or the coding information. In other words, a plurality of program sequences can be set between the play starting point (IN_time) and the play ending point (OUT_time) designated by the playing path (play item) of the play list.

The 3D image flag 221 through the inter-image reference identification flag 227 illustrated in FIG. 29 are information for maintaining the 3D image information in the play list file described before with reference to FIG. 11. The 3D image information is recorded in units of a program sequence.

Therefore, in some case, the 3D image information corresponding to different program sequences may become different information.

An apparatus performing content recording determines whether or not the 3D image is included in the recorded content and records various types of the 3D image information illustrated in FIG. 29 in units of a program sequence in the data block [data_block] recording area in the maker private data area of the clip information file according to the determination information.

An apparatus performing content playing applies the information recorded in the clip information file in units of a program sequence, so that the 3D image playing can be correctly performed.

The detailed example of the 3D image information, that is, the 3D image flag 221 through the inter-image reference identification flag 227 recorded in the data block [data_block] recording area in the maker private data area of the clip information file illustrated in FIG. 29 will be described with reference to FIG. 30 and the following figures. Note that, as described above, the information is individually recorded in units of a program sequence.

(3D Image Flag [ClipInfo_multiview_video_flag] 221)

First, a specific example of the 3D image flag 221 will be described with reference to FIG. 30.

Value of 3D image flag=0: only 2D content is included in content to be played of the program sequence of the clip information, but 3D content is not included therein.

Value of 3D image flag=1: 3D content is likely to be included in content to be played of the program sequence of the clip information.

In this manner, information of flag=0/1 is recorded.

Note that an apparatus performing content recording determines whether or not the 3D image is included in the recorded content and records the aforementioned flag according to the determination information. The process is performed in correspondence to each of the program sequences set in the clip information file.

An apparatus performing content playing identifies whether or not the 3D image is included in the content in units of a program sequence with reference to the value of flag in units of a program sequence of the clip information file.

(3D Image Configuration Information [ClipInfo_multiview_video_configuration] 222)

Next, a specific example of the 3D image configuration information 222 will be described with reference to FIG. 31.

The 3D image configuration information 222 is set as an area where coding mode information of a 3D image which is content played according to the clip information is recorded.

More specifically, as illustrated in FIG. 31, the coding configuration information is recorded as the following setting.

Value=3: side-by-side method (side by side)
Value=4: top-and-bottom method (top and bottom)
Value=5: frame sequential method (frame sequential)
Value=30: MVC coding 2-elementary stream/1-system stream (clip includes two elementary streams which are coded according to MVC coding)
Value=31: MVC coding 2-elementary stream/2-system stream (clip includes one of two elementary streams which are coded according to MVC coding)
Value=32: MVC coding 1-elementary stream/1-system stream
Value=40: independent 2-elementary stream/1-system stream (clip includes two elementary streams which are coded differently from MVC coding)

Value=41: independent 2-elementary stream/2-system stream (clip includes one of two elementary streams which are coded differently from MVC coding)

However, in the case where types of the 3D content mixedly exist in the program sequence or in the case where a type thereof cannot be identified, the value is set to 20 (no information).

The side-by-side method of Value=3 corresponds to the coding method illustrated in FIG. 1 (1).

The top-and-bottom method of Value=4 corresponds to the coding method illustrated in FIG. 1 (2).

The frame sequential method of Value=5 corresponds to the coding method illustrated in FIG. 1 (3).

The MVC coding method of Value=30 to 33 corresponds to the coding method illustrated in FIG. 2 (4).

In this case, the elementary stream is classified as 1 or 2, and the system stream is classified as 1 or 2.

The coding method of Value=40 to 41 corresponds to the coding method illustrated in FIG. 2 (5).

In this case, the elementary stream is classified as 2, and the system stream is classified as 1 or 2.

In the case where the 3D image is included in the recording content, an apparatus performing content recording records the above value according to the coding mode information. This process is performed according to each program sequence set in the clip information file.

Note that, every time when the type of the 3D content is changed, the program sequence is divided and recorded, so that the 3D image recording is performed in the setting where one program sequence is one coding mode.

An apparatus performing content playing identifies the coding mode of the content which is to be played by using the clip information with reference to the above value and performs a decoding process corresponding to the identification information. The coding mode of the 3D image can be determined in units of a program sequence, and the decoding can be performed according to the mode.

(Frame 0 Image Identification Flag [ClipInfo_frame0_is_Left_flag] 223)

Next, a specific example of the frame 0 image identification flag 223 will be described with reference to FIG. 32.

The frame 0 image identification flag 223 is information which is recorded in the case where the 3D image coding method is the frame sequential method (refer to FIG. 1 (3)) and is used during the playing. In other words, the frame 0 image identification flag 223 is used for the case of the setting of (3D image configuration information)=5 described with reference to FIG. 31.

As described above and illustrated in FIG. 1 (3), in the case where the frame sequential method, the left-eye images (L images) and the right-eye images (R images) are set as alternating frames.

For example, in one combination, the frame 0 is set to the left-eye image (L image), and the frame 1 is set to the right-eye image (R image), or in the other combination, the frame 0 is set to the right-eye image (R image), and the frame 1 is set to the left-eye image (L image).

If the L images are observed by only the left eye of the user and the R images are observed by only the right eye, a correct depth effect can be obtained. The information for correctly setting a display sequence of L and R images is the frame 0 image identification flag 223 illustrated in FIG. 32.

More specifically, for example, as illustrated in FIG. 32, the following information is recorded.

Value=2: the frame 0 is the right-eye image (R image)
Value=3: the frame 0 is the left-eye image (L image)

However, in the case where information indicating which one of the L and R images the frame 0 corresponds to cannot be acquired, the value is set to 0 (no information).

In the case where a 3D image is included in the recording content and the coding mode thereof is a frame sequential method, an apparatus performing content recording records the aforementioned value according to the frame information. The process is performed according to each of the program sequences set in the clip information file.

During the decoding process for the content played by using the clip information, an apparatus performing content playing correctly determines whether the frame 0 is an L image or an R image with reference to the aforementioned value and can correctly perform playing and displaying of the L and R images. The playing apparatus can perform the determination in units of a program sequence and perform the decoding process according to the determination information.

(Base Image Identification Flag [ClipInfo_base_view_is_Left_flag] 224)

Next, a specific example of the base image identification flag 224 will be described with reference to FIG. 33.

The base image identification flag 224 is information which is recorded in the case where the 3D image coding method is the MVC coding method (refer to FIG. 2 (4)) and is used during the playing. In other words the base image identification flag 224 is used for the case of the setting of (3D image configuration information)=30 to 32 described with reference to FIG. 31.

In the MVC coding method described with reference to FIG. 2 (4), in some cases, the coding process with reference between the L image and the R image may be performed. In the case where the coding according to the inter-view reference is performed, any one of the L and R images is set as a base view (base image), and the other image is decoded by referring to the base view.

The base image identification flag 224 has a value indicating whether the base view is the L image or the R image. More specifically, for example, as illustrated in FIG. 33, the following information is recorded.

Value=2: the base view is the right-eye image (R image)
Value=3: the base view is the left-eye image (L image)

However, in the case where information indicating which one of the L and R images the base view corresponds to cannot be acquired, the value is set to 0 (no information).

In the case where a 3D image is included in the recording content and the coding mode thereof is an MVC coding method (refer to FIG. 2 (4)), an apparatus performing content recording records the aforementioned value according to the base view information. The recording process is performed in units of a program sequence.

During the decoding process for the content played by using the clip information, an apparatus performing content playing determines whether the base view is an L image or an R image with reference to the aforementioned value and can correctly decode and display the L and R images. The information is acquired in units of a program sequence, and the process can be switched.

(Clip-Adaptive Image Identification Flag [ClipInfo_this_Clip_is_Left_flag] 225)

Next, a specific example of the clip-adaptive image identification flag 225 will be described with reference to FIG. 34.

In the clip-adaptive image identification flag 225, recorded is a flag used in the coding method described with reference to FIG. 2 (5), that is, the coding method [non-inter-view reference independent stream (2 stream) (not MVC)] in the case of the independent 2-elementary stream/2-system stream (2-clip AV stream).

More specifically, the clip-adaptive image identification flag 225 is used for the case of the setting of (3D image configuration information)=41: independent 2-elementary stream/2-system stream (clip includes two elementary streams which are coded differently from MVC coding) described with reference to FIG. 31.

The clip-adaptive image identification flag 225 is information indicating whether the clip is a clip corresponding to a left-eye image (L image) constituting a 3D image or a clip corresponding to a right-eye image (R image) constituting the 3D image. Note that the information is set as information in units of a program sequence.

More specifically, for example, as illustrated in FIG. 34, the clip-adaptive image identification flag 225 has the following values.

Value=2: the clip is the clip corresponding to the right-eye image (R image), and the other clip constituting a pair is the clip corresponding to the left-eye image (L image)

Value=3: the clip is the clip corresponding to the left-eye image (L image), and the other clip constituting a pair is the clip corresponding to the right-eye image (R image)

In other words, the clip-adaptive image identification flag 225 of Value=3 indicates that the clip is an L image (Left view) and the other clip of the pair is an R image (Right view). In addition, the clip-adaptive image identification flag 225 of Value=2 indicates that the clip is an R image (Right view) and the other clip of the pair is an L image (Left view).

Note that, in the case where information indicating which one of the L and R images the content corresponding to the program sequence of the clip corresponds to cannot be acquired, the value is set to 0 (no information).

In the case where a 3D image is included in the recording content and the coding mode thereof is (3D image configuration information)=41: independent 2-elementary stream/2-system stream described with reference to FIG. 31, an apparatus performing content recording records the aforementioned value according to the setting of the produced or updated clip information. The recording process is performed in units of a program sequence.

During the decoding process for the content played by using the clip information, an apparatus performing content playing can correctly determine which one of the L and R images each of the main path and the sub path is a playing path of, with reference to the aforementioned value, and can correctly decode and display the L and R images. The information is acquired in units of a program sequence, and the process can be switched.

(Coding Mode Identification Flag [ClipInfo_use_entropy_coding_mode_flag] 226)

Next, a specific example of the coding mode identification flag 226 will be described with reference to FIG. 35.

In the coding mode identification flag 226, recorded is a flag used in the coding method described with reference to FIG. 2 (4), that is, the coding method [inter-view reference stream (MVC)].

More specifically, the coding mode identification flag 226 is used for the case of the setting of (3D image configuration information)=30 to 32 described with reference to FIG. 31.

The coding mode identification flag 226 is an identification flag indicating whether or not the coding process using the entropy coding mode is performed as a coding process.

Note that, as described above, more specifically, the coding process using the entropy coding mode is, for example, a coding process using CABAC (Context-based Adaptive Binary Arithmetic Coding).

More specifically, the coding process using no entropy coding mode is, for example, a coding process using CAVLC (Context-based Adaptive Variable Length Coding).

More specifically, for example, as illustrated in FIG. 35, the following information is recorded.

Value=1: the entropy coding mode is not used

Value=2: the entropy coding mode is likely to be used

Note that, in the case where information on the coding of the coding data corresponding to the program sequence of the clip information cannot be acquired, the value is set to 0 (no information).

In the case where a 3D image is included in the recording content and the coding mode thereof is an MVC coding method (refer to FIG. 2 (4)), an apparatus performing content recording records the aforementioned value according to whether or not the coding process uses the entropy coding mode. The recording process is performed in units of a program sequence.

During the decoding process for the content played by using the clip information, an apparatus performing content playing identifies the coding mode with reference to the aforementioned value and can correctly decode and display the L and R images. The information is acquired in units of a program sequence, and the process can be switched.

Note that, for example, in some cases, the playing apparatus may be an apparatus which cannot decode the CAVLC coding data in the entropy coding mode. In this case, the decoding and playing processes for the 3D image are stopped, and the process of playing a 2D image by playing only the L images or only the R images can be performed based on the setting information of the coding mode identification flag 226. If the flag does not exist, the playing apparatus cannot identify whether or not the coding is made in the coding mode in which the playing apparatus can perform the playing, so that the playing apparatus starts the decoding process. As a result, process error occurs.

(Inter-Image Reference Identification Flag [ClipInfo_use_inter-view_prediction_flag] 227)

Next, the inter-image reference identification flag [ClipInfo_use_inter-view_prediction_flag] 227 will be described with reference to FIG. 36.

In the inter-image reference identification flag 227, recorded is a flag used in the coding method described with reference to FIG. 2 (4), that is, the coding method [inter-view reference stream (MVC)].

More specifically, the inter-image reference identification flag 227 is also used for the case of the setting of (3D image configuration information)=30 to 32 described with reference to FIG. 31.

The inter-image reference identification flag 227 is information indicating whether or not the coding with the inter-view reference being performed is performed in the case of the setting of (3D image configuration information)=30 to 32 described with reference to FIG. 31.

Even in the coding process according to the setting of the coding method described with reference to FIG. 2 (4), that is, [inter-view reference stream (MVC)], in some cases, actually, the reference process between the L image and the R image may not be performed More specifically, the coding data used as content to be played corresponding to the program sequence of one clip information include:

only the coding data with no reference between the L image and the R image; and the coding data with reference between the L image and the R image.

A flag which can identify the two types of the data is set as the inter-image reference identification flag 227.

More specifically, for example, as illustrated in FIG. 36, the following information is set.

Value=1: non-inter-view reference

Value=2: inter-view reference is likely to be included

However, in the case where information on the coding of the coding data corresponding to the program sequence of the clip information cannot be acquired, the value is set to 0 (no information).

In the case where a 3D image is included in the recording content and the coding mode thereof is an MVC coding method (refer to FIG. 2 (4)), an apparatus performing content recording records the aforementioned value according to whether or not the inter-view reference is performed in the coding process.

During the decoding process for the content played by using the clip information, an apparatus performing content playing identifies the coding mode with reference to the aforementioned value and can correctly decode and display the L and R images.

[4. Process Sequences Performed by Information Processing Device]

Next, process sequences performed by the information processing device will be described with reference to flowcharts of FIG. 37 and following figures. Note that the processes described in the following flows are performed in a data processing unit of the information processing device. The data processing unit includes a CPU having a function of executing programs. For example, a series of processes are performed according to a program recorded in a memory.

(4-1. Recording Process Sequence for Content)

First, a data recording process sequence with respect to a medium will be described with reference to the flowchart illustrated in FIG. 37. Note that the process is a process of the case where recorded data include 3D image content.

In Steps S101 to S103, the information processing device checks the number of image (video) elementary streams of 3D image content, for example, acquired from a photographing process or externally input and the number of transport streams. In Step S101, the information is acquired from attribute information (meta data) or the like set in input data, or it is acquired through analysis of an input stream.

Note that the elementary stream is a data stream just after image encoding, and the transport stream is stream data setting time stamp or other data, for example, data for synchronization with audio information or the like. A process of generating MPEG data file (for example, an m2ts file) based on the transport stream multiplexed with the elementary stream and recording the file on a medium is performed.

There are a case where a 3D image is recorded, a case where L images and R images are set as individual elementary streams, and a case where L images and R images are set as one elementary stream.

In addition, in the case where L images and R images are set as one elementary stream, one transport stream is generated from the one elementary stream. In the case where L images and R images are set as individual elementary streams, there are a case where two individual transport streams are used and a case where the two elementary streams are collectively set as one transport stream. These cases are determined according to the coding modes, for example, described above with reference to FIGS. 1 and 2.

Note that, in some configurations, in the case where a method of coding the 3D image is determined in advance according to an input source, for example, a specific broadcasting station or a specific-type apparatus, a table or the like according to the input source may be stored, and the type of input data may be determined through a process of referring to the table.

In Step S102, it is determined whether the number of image (video) elementary streams is 1 or 2. In the case where the number is 1, the process sequence proceeds to Step S121. In the case where the number is 2, the process sequence proceeds to Step S103.

In Step S103, it is determined whether the number of transport streams is 1 or 2. In the case where the number is 1, the process sequence proceeds to Step S121. In the case where the number is 2, the process sequence proceeds to Step S111.

The case where the process sequence proceeds to Step S111 is a case where the L image and the R image constituting the 3D image are set as individual, that is, two transport streams.

On the other hand, the case where the process sequence proceeds to Step S121 is a case where the L image and the R image constituting the 3D image are set as one transport stream.

First, the processes of Step S111 and the following steps will be described. In other words, the processes of the case where the L image and the R image constituting the 3D image are set as individual, that is, two transport streams will be described.

In Step S111, two input streams are analyzed to produce an entry point map, and the two input streams are recorded as another AV stream file (MPEG-2 transport streams (m2ts) files). In other words, two clips are produced. Note that, herein, the clip denotes one file set of an AV stream file storing actual content and a clip information file as a management information file.

In Step S112, the following process is performed for each of the m2ts files corresponding to two clips.

A program sequence representing a 3D content portion is produced.

A 3D image flag [ClipInfo_multiview_video_flag] of the clip information file is set to [1] and is recorded together with the entry point map (EP map) in the clip information file.

As described above, information is recorded in the clip information in units of a program sequence (program_sequence) as a play partition unit for partitioning a clip. The program sequence has only one system time base at the same time point and has only one PMT (Program Map Table) at the same time point.

In addition, as described with reference to FIG. 23 and FIGS. 26 to 28, for example, the entry point map (EP map) where I-picture position information or the like as a play starting point during the random play or the like is recorded is recorded in the clip information file.

In Step S112, the clip information file is produced for each of the clips corresponding to each of L and R images. Note that, during the process, besides the setting of the 3D image flag [ClipInfo_multiview_video_flag] of the clip information file to [1] in units of a program sequence, the process of recording the 3D image information is performed.

Figure 38:
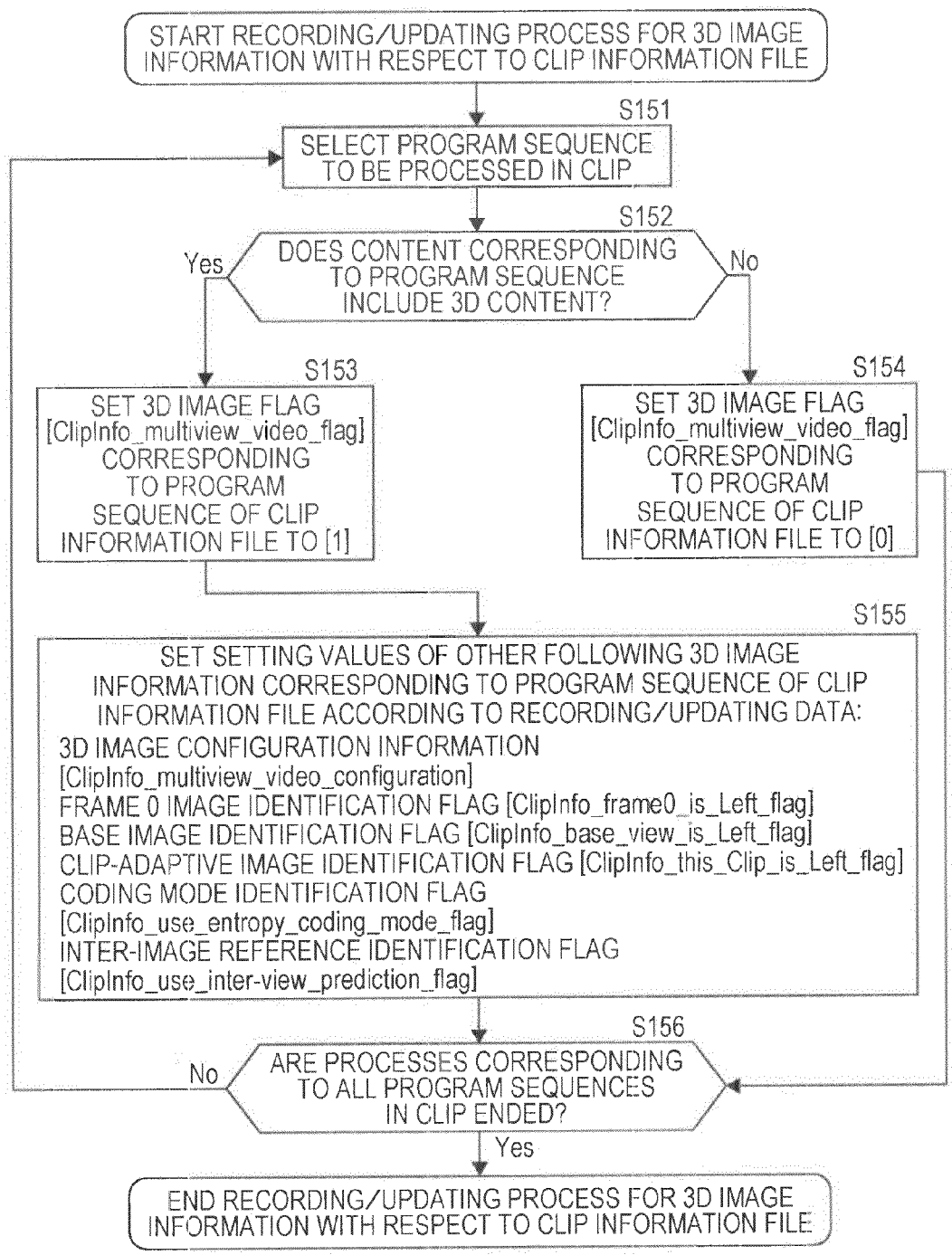
FIG. 38 is a flowchart illustrating a recording/updating process sequence for 3D image information with respect to a clip information file performed by an information processing device.
Figure 39:
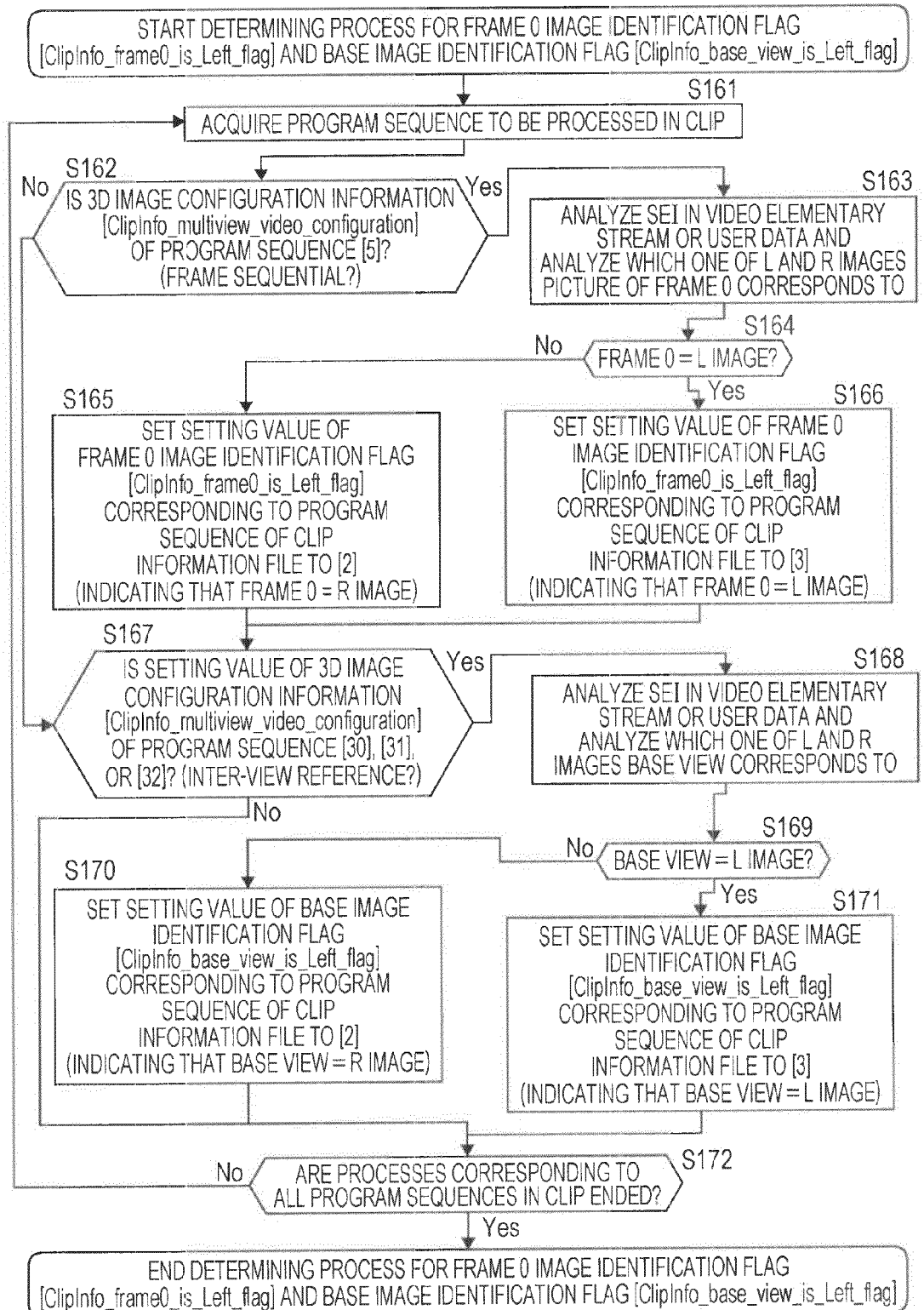
FIG. 39 is a flowchart illustrating a recording/updating process sequence for a frame 0 image identification flag and a base image identification flag as 3D image information with respect to a clip information file performed by an information processing device.

The process will be described in detail with reference to the flowcharts illustrated later in FIGS. 38 and 39.

Following processes of Steps S113 to S115 are processes relating to a play list file.

First, in Step S113, with respect to a first clip, playing path information (play item (PlayItem)) referring to a position of a clip at which 3D content is included is generated.

Note that a clip corresponding to one of L and R images as constituent streams of 3D image content is set as a first clip, and a clip corresponding to the other image is set as a second clip.

In Step S114, with respect to the second clip, playing path information (sub play item (SubPlayItem)) referring to a position of a clip at which 3D content is included is generated.

In Step S115, a play list including a main path (play item (PlayItem)) and a sub path (sub play item (SubPlayItem)) is produced. In addition, a 3D image flag [Playlist_multiview_video_flag] of a play list file indicating that the play list includes 3D image content is set to [1].

Note that, during the production of the play list file, a process of setting values according to recorded images with respect to 3D image information besides the 3D image flag is performed. The detailed process thereof will be described later with reference to the flowchart of FIG. 40.

Finally, in Step S131, an information file is updated. During this process, a process of setting the 3D image flag [Index_multiview_video_flag] indicating that 3D content is included to [1] in the 3D image information recorded in the information file is performed.

Next, processes of Step S121 and the following steps will be described. In other words, the processes of the case where the L image and the R image constituting the 3D image are collectively set as one transport stream will be described.

In Step S121, one input stream is analyzed to produce an entry point map, and the input stream is recorded as one AV stream file (MPEG-2 transport streams (m2ts) files). In other words, one clip is produced. The clip denotes one file set of an AV stream file storing actual content and a clip information file as a management information file.

In Step S122, the following process is performed for the m2ts file corresponding to the clip.

A program sequence representing a 3D content portion is produced.

A 3D image flag [ClipInfo_multiview_video_flag] of the clip information file is set to [1] and is recorded together entry point map (EP map) in the clip information file.

Note that, during the process, besides the setting of the 3D image flag [ClipInfo_multiview_video_flag] of the clip information file to [1] in units of a program sequence, the process of recording the 3D image information is performed. The detailed process thereof will be described later with reference to the flowcharts of FIGS. 38 and 39.

Following processes of Steps S123 to S124 are processes relating to a play list file.

First, in Step S123, with respect to a clip, playing path information (play item (PlayItem)) referring to a position of a clip at which 3D content is included is generated.

Note that, in this case, with respect to the clip, the L and R images are also included in one clip, and with respect to the generated path information, only the main path (play item) is generated, and the sub path (sub play item) for 3D image is not generated.

In Step S124, a play list including the main path (play item (PlayItem)) is produced. In addition, a 3D image flag [Playlist_multiview_video_flag] of a play list file indicating that the play list includes 3D image content is set to [1].

Note that, during the production of the play list file, a process of setting values according to recorded images with respect to 3D image information besides the 3D image flag is performed. The detailed process thereof will be described later with reference to the flowchart of FIG. 40.

Finally, in Step S131, an information file is updated. During this process, a process of setting the 3D image flag [Index_multiview_video_flag] indicating that 3D content is included to [1] in the 3D image information recorded in the information file is performed.

(4-2. Recording/Updating Process Sequences for 3D Image Information with Respect to Clip Information File)

Next, a recording/updating process sequence of recording or updating the 3D image information of the clip information file will be described with reference to the flowchart of FIG. 38.

Figure 37:
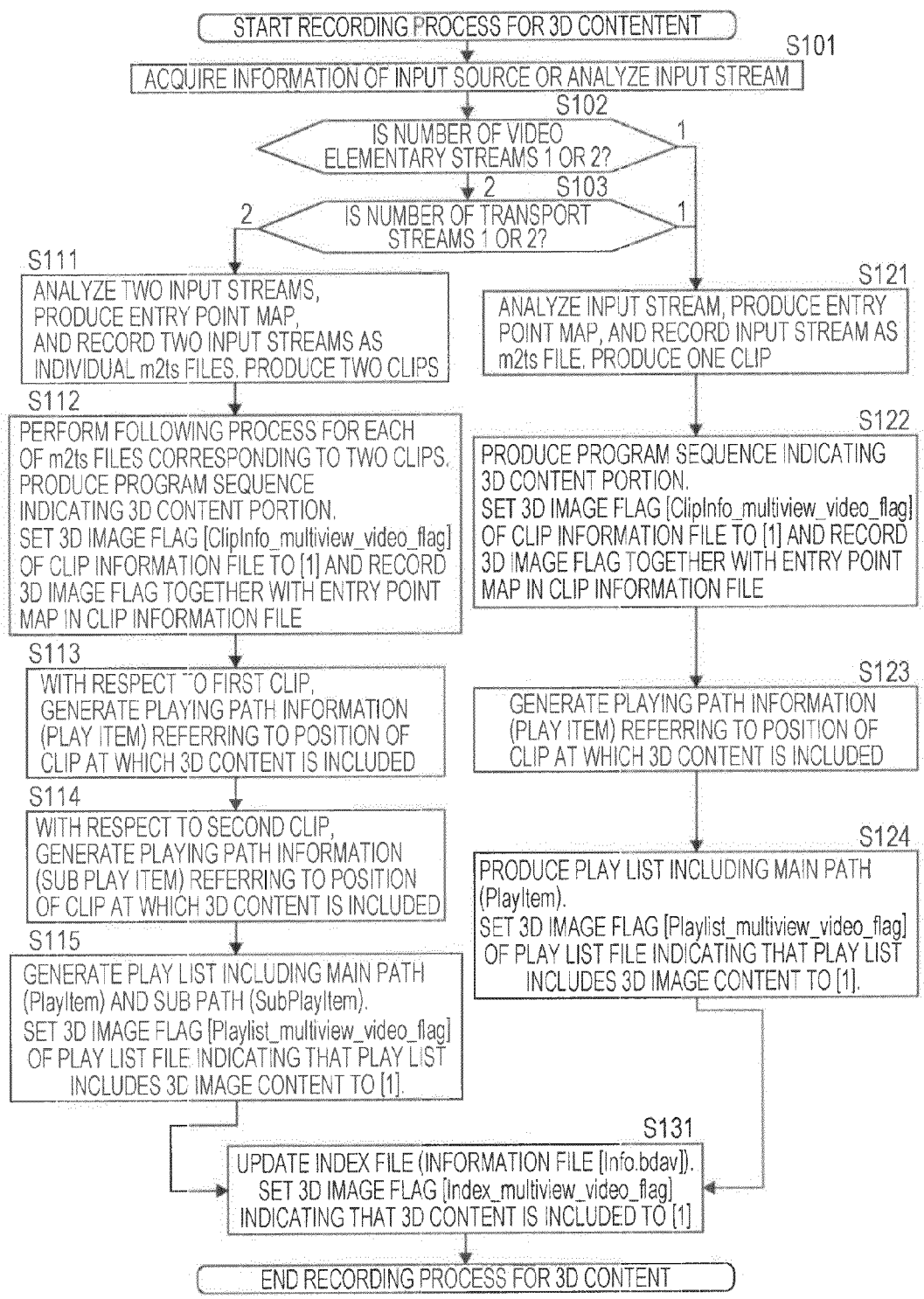
FIG. 37 is a flowchart illustrating a recording process sequence for content performed by an information processing device.

The process relates to flows of detailed processes of Steps S112 and S122 in the flowchart illustrated in FIG. 37.

First, in Step S151, a program sequence to be processed in a clip is selected.

Next, in Step S152, it is determined whether or not content corresponding to the selected program sequence includes 3D content. In the case where the content includes the selected program sequence, the process sequence proceeds to Step S153. In the case where the content do not include the selected program sequence, the process sequence proceeds to Step S154.

In the case where the content do not include the selected program sequence, the process sequence proceeds to Step S154, so that the 3D image flag [ClipInfo_multiview_video_flag] corresponding to the program sequence of the clip information file is set to [0]. In other words, a flag indicating that the 3D image is not included in the content corresponding to the program sequence is set. Next, the process sequence proceeds to Step S156.

On the other hand, in Step S152, when it is determined that the content corresponding to the selected program sequence includes 3D content, the process sequence proceeds to Step S153, so that the 3D image flag [ClipInfo_multiview_video_flag] corresponding to the program sequence of the clip information file is set to [1]. In other words, a flag indicating that the 3D image is included n the content corresponding to the program sequence is set.

Next, the process sequence proceeds to Step S155, so that a process of recording 3D image information other than the 3D image information corresponding to the program sequence of the clip information file is performed. In other words, the process of setting values for the following 3D image information described before with reference to FIG. 29 is performed.

3D image configuration information [ClipInfo_multiview_video_configuration]

frame 0 image identification flag [ClipInfo_frame0_is_Left_flag]

base image identification flag [ClipInfo_base_view_is_Left_flag]

clip-adaptive image identification flag [ClipInfo_this_Clip_is_Left_flag], coding mode identification flag [ClipInfo_use_entropy_coding_mode_flag]

inter-image reference identification flag [ClipInfo_use_inter-view_prediction_flag]

The process of setting the above setting values according to recording/updating data is performed.

Note that the above information is set according to information of the coding mode or the like of 3D image to be recorded.

After the process, the process sequence proceeds to Step S156. In Step S156, it is determined whether or not the processes corresponding to all the program sequences set in the clip are ended. In the case where there is a non-ended program sequence, the processes of Step S151 and the following steps are performed with respect to the non-ended program sequence.

In the case where it is determined that the processes corresponding to all the program sequences set in the clip are ended in Step S156, the process is ended.

(4-3. Recording/Updating Process Sequences for Frame 0 Image Identification Flag and Base Image Identification Flag as 3D Image Information with Respect to Clip Information File)

Next, a recording sequence with respect to the following information among the 3D image information recorded in the clip information file, that is, a frame 0 image identification flag [ClipInfo_frame0_is_Left_flag] and a base image identification flag [ClipInfo_base_view_is_Left_flag] will be described with reference to the flowchart illustrated in FIG. 39.

First, in Step S161, a program sequence to be processed in a clip is selected.

Next, Step S162, 3D image configuration information [ClipInfo_multiview_video_configuration] is acquired from the 3D image information corresponding to the selected program sequence, and it is determined whether or not the setting value thereof is [5]. In other words, it is determined whether or not the coding method is a frame sequential method.

The frame 0 image identification flag is a value referred to only in the case of the frame sequential method in the playing apparatus. In addition, during the recording process, recording of valid information is performed only in the case where the recording image relates to the frame sequential method.

In Step S162, in the case where it is determined that the setting value of the 3D image configuration information is [5], the process sequence proceeds to Step S163. In the case where it is determined that the setting value is not [5], the process sequence proceeds to Step S167.

In the case where it is determined that the setting value of the 3D image configuration information is [5] in Step S162, in Step S163, meta data, for example, SEI (Supplemental Enhancement Information) in the image (video) elementary stream or user data are analyzed, and it is determined whether the frame 0 image is an L image or an R image.

In Step S164, in the case where it is determined that the frame 0 image is an L image, the process sequence proceeds to Step S166, so that the setting value of the frame 0 image identification flag [ClipInfo_frame0_is_Left_flag] corresponding to the program sequence of the clip information file is set to [3] (indicating that frame 0=L image).

On the other hand, in Step S164, in the case where it is determined that the frame 0 image is an R image, the process sequence proceeds to Step S165, the setting value of the frame 0 image identification flag [ClipInfo_frame0_is_Left_flag] corresponding to the program sequence of the clip information file is set to [2] (indicating that frame 0=R image).

After the process is completed, the process sequence proceeds to Step S167.

In Step S167, 3D image configuration information [ClipInfo_multiview_video_configuration] is acquired from the 3D image information corresponding to the selected program sequence, and it is determined whether or not the setting value thereof [30], [31], or [32]. In other words, it is determined whether or not the coding method is a coding method where inter-view reference is likely to be performed.

The base image identification flag [ClipInfo_base_view_is_Left_flag] is a value referred to only in the case of the coding method where inter-view reference is likely to be performed in the playing apparatus. In addition, during the recording process, valid information is recording is performed only in the case where the recording image relates to the coding method where inter-view reference is likely to be performed.

In the case where it is determined that the setting value of the 3D image configuration information is [30], [31], or [32] in Step S167, the process sequence proceeds to Step S168. In the case where it is determined that the setting value is not [30], [31], or [32], the process sequence proceeds to Step S172.

In the case where it is determined that the setting value of the 3D image configuration information is [30], [31], or [32] in Step S167, in Step S168, meta data, for example, SEI (Supplemental Enhancement Information) in the image (video) elementary stream or user data are analyzed, and it is determined whether the base view image is an L image or an R image.

In Step S169, in the case where it is determined that the base view image is an L image, the process sequence proceeds to Step S171, so that the setting value of the base image identification flag [ClipInfo_base_view_is_Left_flag] corresponding to the program sequence of the clip information file is set to [3] (indicating that base view=L image).

On the other hand, in Step S169, in the case where it is determined that the base view image is an R image, the process sequence proceeds to Step S170, so that the setting value of the base image identification flag [ClipInfo_base_view_is_Left_flag] corresponding to the program sequence of the clip information file is set to [2] (indicating that base view=R image).

After the process, the process sequence proceeds to Step S172. In Step S172, it is determined whether or not the processes corresponding to all the program sequences set in the clip are ended. In the case where there is a non-ended program sequence, the processes of Step S161 and the following steps are performed with respect to the non-ended program sequence.

In the case where it is determined that the processes corresponding to all the program sequences set in the clip are ended in Step S172, the process is ended.

(4-4. Recording/Updating Process Sequences for 3D Image Information with Respect to Play List File)

Figure 40:
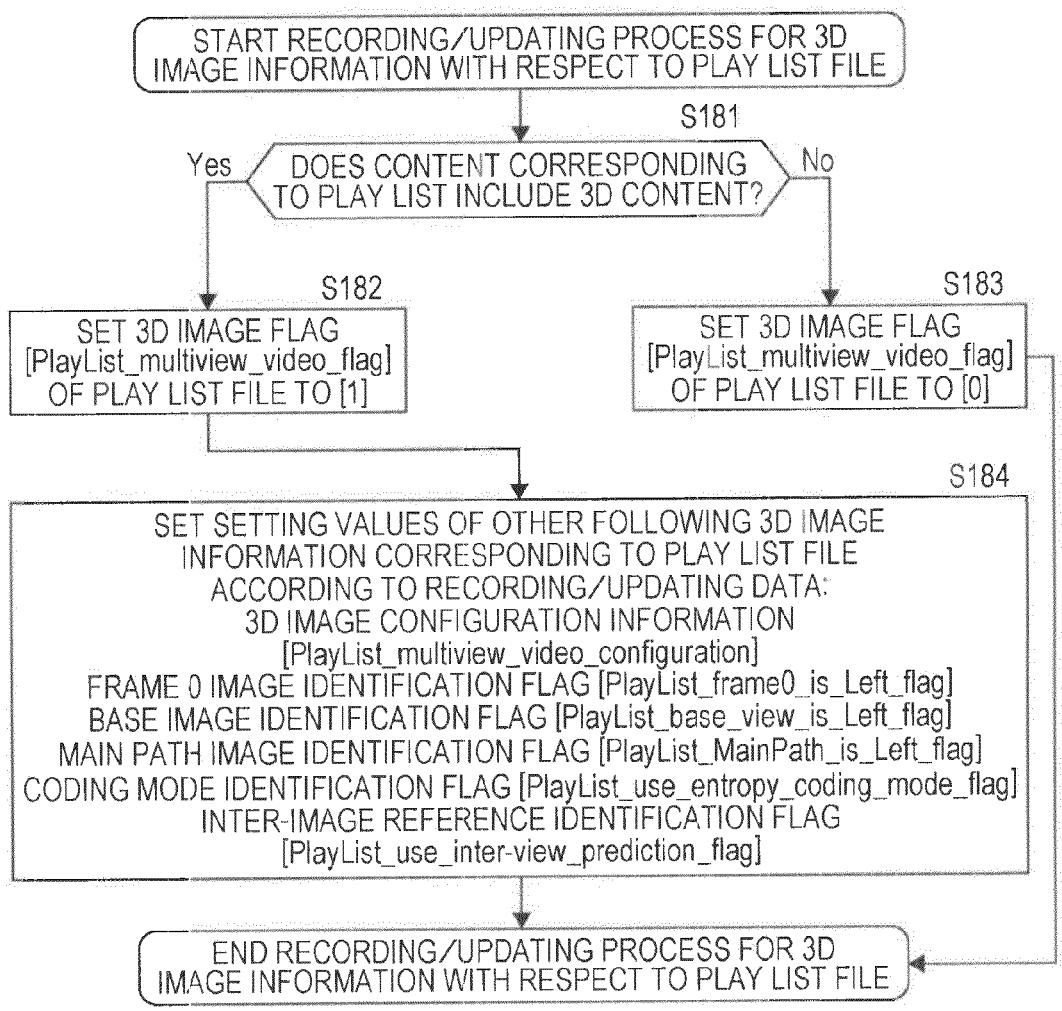
FIG. 40 is a flowchart illustrating a recording/updating process sequence for 3D image information with respect to a play list file performed by an information processing device.

Next, a recording/updating process sequence of recording or updating the 3D image information of the play list file will be described with reference to the flowchart of FIG. 40.

The process relates to flows of detailed processes of Steps S115 and S124 in the flowchart illustrated in FIG. 37.

First, in Step S181, it is determined whether or not content corresponding to the play list to be processed includes 3D content. In the case where the content includes 3D content, the process sequence proceeds to Step S182. In the case where the content do not include 3D content, the process sequence proceeds to Step S183.

In the case where it is determined that the content do not include 3D content, the process sequence proceeds to Step S183, so that the 3D image flag [PlayList_multiview_video_flag] of the play list file is set to [0]. In other words, a flag indicating that the 3D image is not included is set in the content corresponding to the play list, and the process is ended.

On the other hand, in Step S181, in the case where it is determined that content corresponding to the play list to be processed includes 3D content, the process sequence proceeds to Step S182, so that the 3D image flag [PlayList_multiview_video_flag] corresponding to the program sequence of the play list file is set to [1]. In other words, a flag indicating that the 3D image is included n the content corresponding to the play list file is set.

Next, the process sequence proceeds to Step S184, so that a process of recording 3D image information other than the 3D image information corresponding to the play list file is performed. In other words, the process of setting values for the following 3D image information described before with reference to FIG. 11 is performed.

3D image configuration information [PlayList_multiview_video_configuration]

frame 0 image identification flag [PlayList_frame0_is_Left_flag]

base image identification flag [PlayList_base_view_is_Left_flag]

main path image identification flag [PlayList_Main-Path_Left_flag]

coding mode identification flag [PlayList_use_entropy_coding_mode_flag]

inter-image reference identification flag [PlayList_use_inter-view_prediction_flag]

The process of setting the above setting values according to recording/updating data is performed.

Note that the above information is set according to information of the coding mode or the like of 3D image to be recorded.

After the process, the process sequence is ended.

(4-5. Additional Recording Process Sequence for Content)

Figure 41:
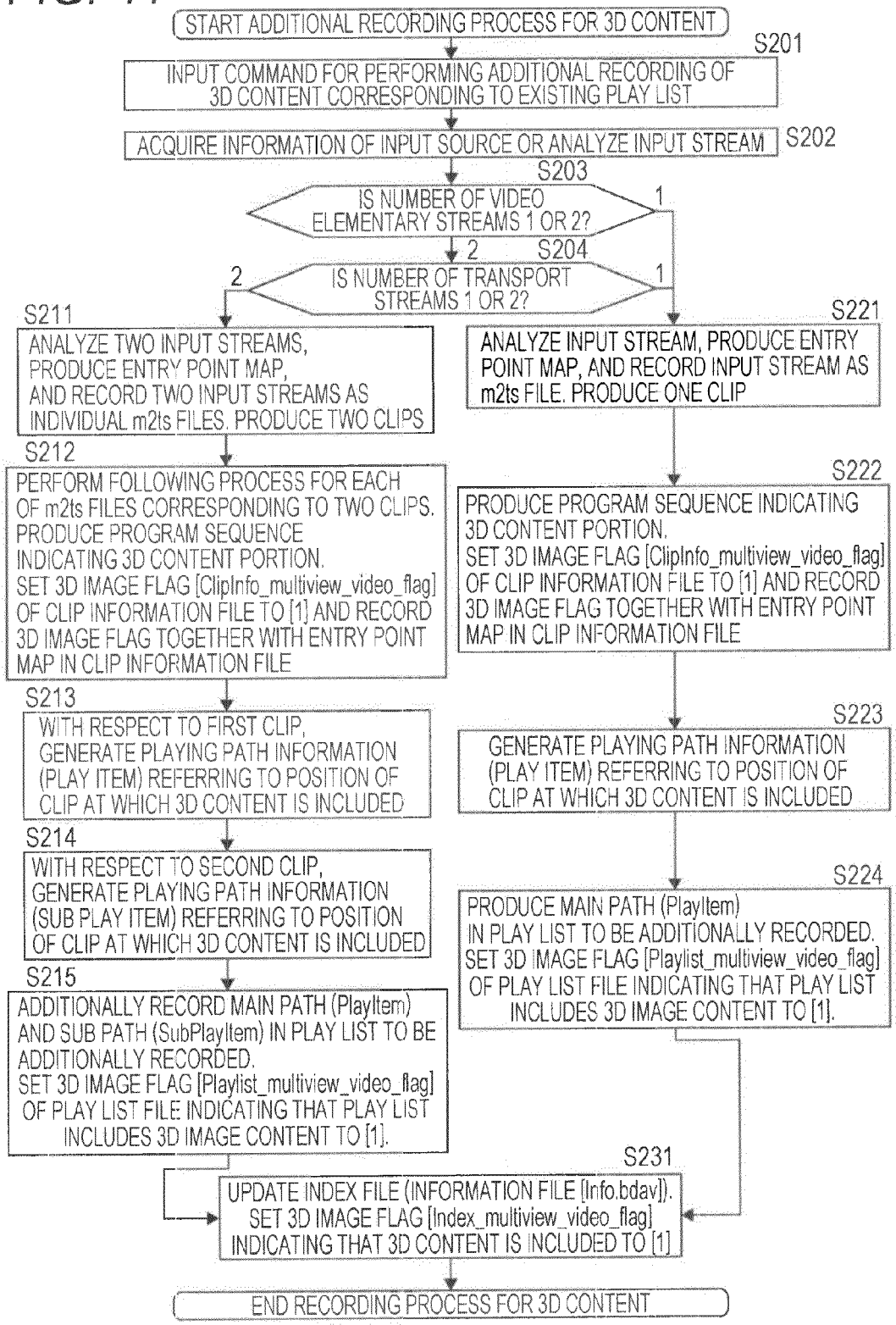
FIG. 41 is a flowchart illustrating an additional recording process sequence for content performed by an information processing device.

Next, an additional recording process sequence for 3D image will be described with reference to FIG. 41.

In other words, with respect to the content of which recording is already completed on a medium, in the case where a play list corresponding to the recording-completed content exists on the medium, the process sequence of additionally recording new content corresponding to an existing play list is performed.

First, in Step S201, a command for performing additional recording of 3D content corresponding to the existing play list is input. For example, command information or the like for performing additional recording of a photographed image in a video camera or the like is input from a user.

The processes of Step S202 and the following steps are similar to the processes described before with reference to FIG. 37.

In Steps S202 to S204, the information processing device checks the number of image (video) elementary streams of 3D image content, for example, acquired from a photographing process or externally input and the number of transport streams. In Step S202, the information is acquired from attribute information (meta data) or the like set in input data, or it is acquired through analysis of an input stream.

In Step S203, it is determined whether the number of image (video) elementary streams is 1 or 2. In the case where the number is 1, the process sequence proceeds to Step S121. In the case where the number is 2, the process sequence proceeds to Step S204.

In Step S204, it is determined whether the number of transport streams is 1 or 2. In the case where the number is 1, the process sequence proceeds to Step S221. In the case where the number is 2, the process sequence proceeds to Step S211.

The case where the process sequence proceeds to Step S211 is a case where the L image and the R image constituting the 3D image are set as individual, that is, two transport streams.

On the other hand, the case where the process sequence proceeds to Step S221 is a case where the L image and the R image constituting the 3D image are set as one transport stream.

First, the processes of Step S211 of the following steps will be described. In other words, the processes of the case where the L image and the R image constituting the 3D image are set as individual, that is, two transport streams will be described.

In Step S211, two input streams are analyzed to produce an entry point map, and the two input streams are recorded as another AV stream file (MPEG-2 transport streams (m2ts) files). In other words, two clips are produced. Note that, herein, the clip denotes one file set of an AV stream file storing actual content and a clip information file as a management information file.

In Step S212, the following process is performed for each of the m2ts files corresponding to two clips.

A program sequence representing a 3D content portion is produced.

A 3D image flag [ClipInfo_multiview_video_flag] of the clip information file is set to [1] and is recorded together with the entry point map (EP map) in the clip information file.

In Step S212, the clip information file is produced for each of the clips corresponding to each of L and R images. Note that, during the process, besides the setting of the 3D image flag [ClipInfo_multiview_video_flag] of the clip information file to [1] in units of a program sequence, the process of recording the 3D image information is performed. Note that, in this step, the processes described before with reference to the flowcharts illustrated in FIGS. 38 and 39 are performed.

Following processes of Steps S213 to S215 are processes relating to a play list file.

First, in Step S213, with respect to a first clip, playing path information (play item (PlayItem)) referring to a position of a clip at which 3D content is included is generated.

Note that a clip corresponding to one of L and R images as constituent streams of 3D image content is set as a first clip, and a clip corresponding to the other image is set as a second clip.

In Step S214, with respect to the second clip, playing path information (sub play item (SubPlayItem)) referring to a position of a clip at which 3D content is included is generated.

In Step S215, a main path (play item (PlayItem)) and a sub path (sub play item (SubPlayItem)) are additionally recorded in a play list to be additionally recorded. In addition, a 3D image flag [Playlist_multiview_video_flag] of a play list file indicating that the play list includes 3D image content is set to [1].

Note that, during the updating of the play list file, a process of setting values according to recorded images with respect to 3D 3D image information besides the 3D image flag is performed. The detailed processes thereof are the same as the processes described before with reference to the flowchart of FIG. 40.

Finally, in Step S231, and information file is updated. During this process, a process of setting the 3D image flag [Index_multiview_video_flag] indicating that 3D content is included to [1] in the 3D image information recorded in the information file is performed.

Next, processes of Step S221 and the following steps will be described. In other words, the processes of the case where the L image and the R image constituting the 3D image are collectively set as one transport stream will be described.

In Step S221, one input stream is analyzed to produce an entry point map, and the input stream is recorded as one AV stream file (MPEG-2 transport streams (m2ts) files). In other words, one clip is produced. The clip denotes one file set of an AV stream file storing actual content and a clip information file as a management information file.

In Step S222, the following process is performed for the m2ts file corresponding to the clip.

A program sequence representing a 3D content portion is produced.

A 3D image flag [ClipInfo_multiview_video_flag] of the clip information file is set to [1] and is recorded together entry point map (EP map) in the clip information file.

Note that, besides the setting of the 3D image flag [ClipInfo_multiview_video_flag] of the clip information file to [1] in units of a program sequence, the process of recording the 3D image information is performed. The detailed process thereof is the same as described above with reference to the flowcharts of FIGS. 38 and 39.

Following processes of Steps S223 to S224 are processes relating to a play list file.

First, in Step S223, with respect to a clip, playing path information (play item (PlayItem)) referring to a position of a clip at which 3D content is included is generated.

Note that, in this case, with respect to the clip, the L and R images are also included in one clip, and with respect to the generated path information, only the main path (play item) is generated, and the sub path (sub play item) for 3D image is not generated.

In Step S224, a main path (play item (PlayItem)) as playing path information corresponding to to-be-additionally-recorded content is produced in the play list to be additionally recorded. In addition, a 3D image flag [Playlist_multiview_video_flag] of a play list file indicating that the play list includes 3D image content is set to [1].

Note that, during the updating of the play list file, a process of setting values according to recorded images with respect to 3D image information besides the 3D image flag is performed. The detailed process thereof is the same as described above with reference to FIG. 40.

Finally, in Step S231, an information file is updated. During this process, a process of setting the 3D image flag [Index_multiview_video_flag] indicating that 3D content is included to [1] in the 3D image information recorded in the information file is performed.

(4-6. Editing Process Sequence for Content)

Next, a data editing process sequence performed by the information processing device will be described with reference to the flowchart of FIG. 42.

Figure 42:
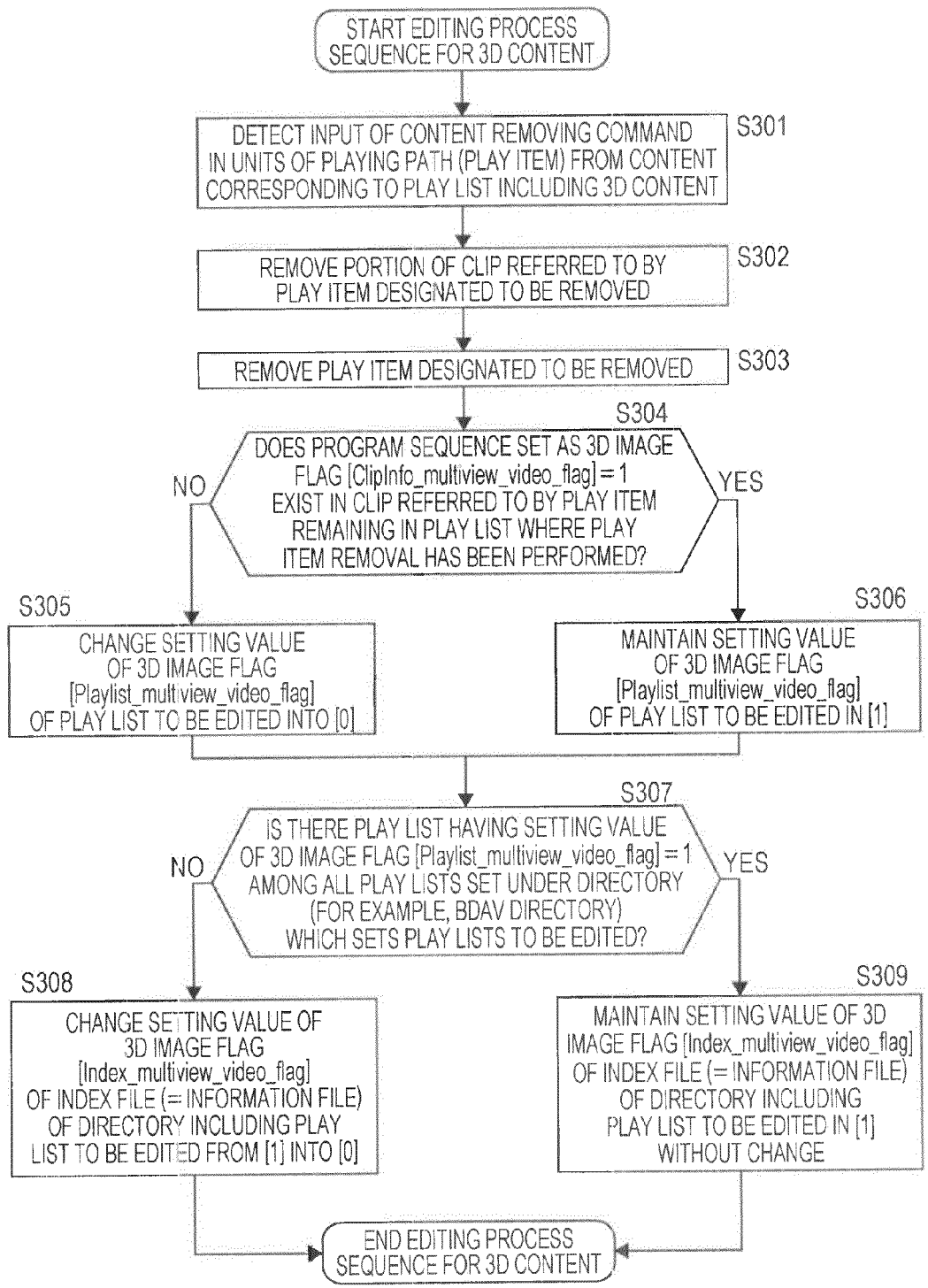
FIG. 42 is a flowchart illustrating an editing process sequence for content performed by an information processing device.

The flow illustrated in FIG. 42 is a flow describing a process sequence in the case where an editing process of removing 3D image content of which recording is already completed on a medium is performed.

First, in Step S301, an input of a content removing command from a user is detected. The content removing is performed in a predetermined removing unit. More specifically, the content removing is performed in units of a play item which is playing path information set in a play list.

In Step S302, a designated portion of a clip (a clip information file and an AV stream file) referred to by the removing-designated play item is removed.

In Step S303, the removing-designated play item is removed.

Next, in Step S304, it is determined whether or not a program sequence set as 3D image flag [ClipInfo_multiview_video_flag]=1 exists in the clip referred to by a play item remaining in the play list where the play item removing is performed. In other words, it is determined whether or not there is a program sequence having the 3D image flag=1 indicating that 3D image is included as 3D image information of the program sequence remaining in the after-removing clip.

In any case, the process sequence proceeds to Step S306, so that the setting value of the 3D image flag [Playlist_multiview_video_flag] of the play list to be edited is maintained to be set to [1]. In other words, the 3D image flag=1 indicating that 3D image is included in the content to be played of the after-removing-process play list is maintained.

On the other hand, in Step S304, in the case where it is determined that there is no program sequence where 3D image flag [ClipInfo_multiview_video_flag]=1 is set in the clip referred to by the play item remaining in the play list where the play item removing is performed, the process sequence proceeds to Step S305.

In Step S305, the setting value of the 3D image flag [Playlist_multiview_video_flag] of the play list to be edited is changed from [1] into [0]. In other words, the 3D image flag=0 indicating that 3D image is not included in the content to be played of the after-removing play list is set.

Next, in Step S307, it is determined whether or not there is a play list of which the setting value of 3D image flag [Playlist_multiview_video_flag] is [1] among all the play lists set under the directory (for example, the BDAV directory illustrated in FIG. 3) which sets play lists to be edited. In other words, it is determined whether or not a play list which sets a flag indicating that 3D image is included remains. In the case where the play list remains, the process sequence proceeds to Step S309. In the case where the play list does not remain, the process sequence proceeds to Step S308.

In the case where it is determined that the play list remains, in Step S309, the setting value [1] of the 3D image flag [Index_multiview_video_flag] of the information file of the directory including the play list to be edited is not changed but maintained. In other words, the value of the flag indicating that 3D image is included in the content under the management of the information file is maintained.

On the other hand, in the case where it is determined that there is no play list having 3D image flag=1 in the play lists under the directory setting the play list to be edited in Step S307, in Step S308, the setting value of the 3D image flag [Index_multiview_video_flag] of the information file of the directory including the play list to be edited is changed from [1] into [0]. In other words, the value of the flag indicating that 3D image is not included in the content under the management of the information file is set.

(4-7. Playing Process Sequence for Content)

Figure 43:
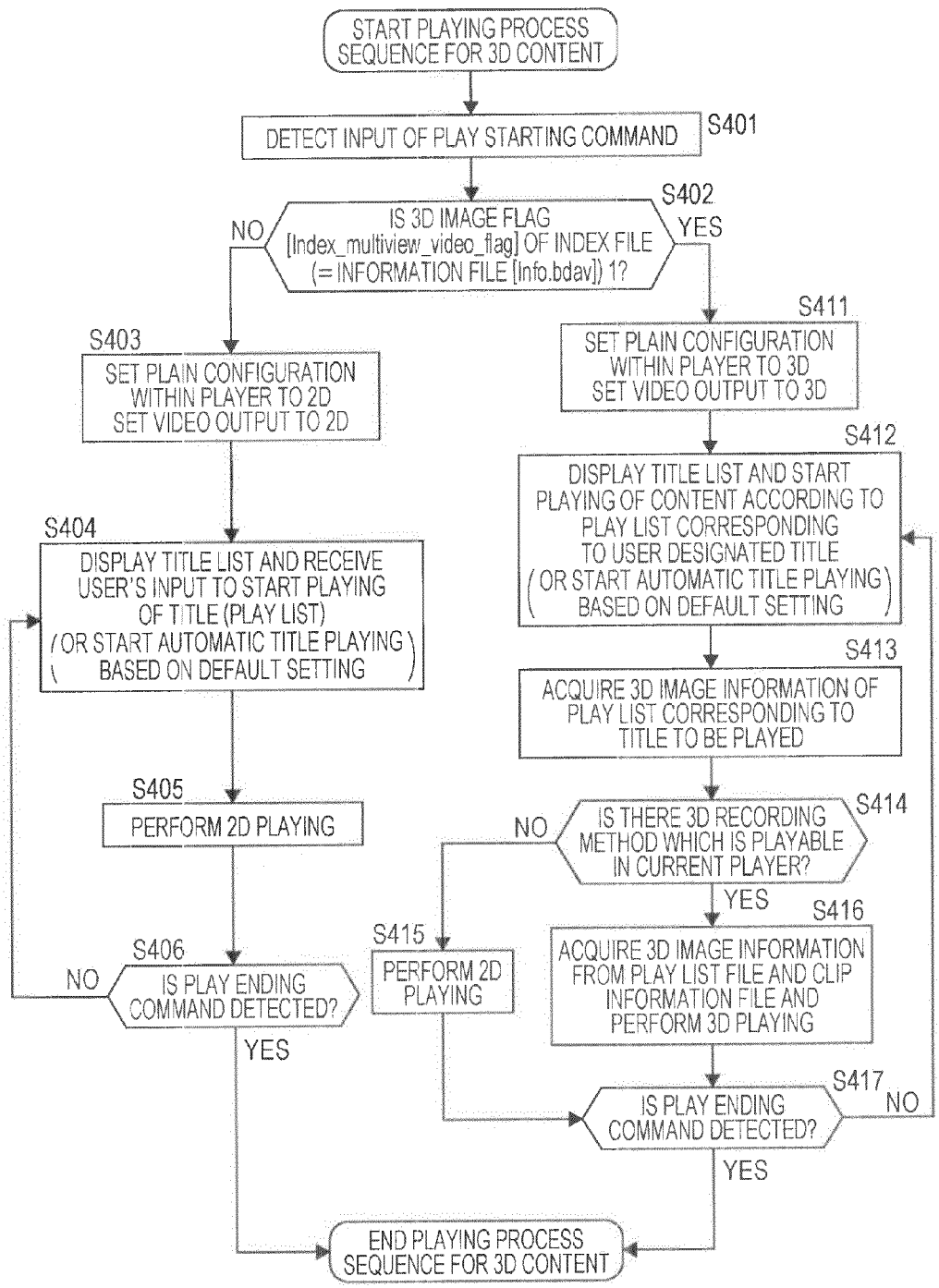
FIG. 43 is a flowchart illustrating a playing process sequence for content performed by an information processing device.

Next, a content playing process sequence of the information processing device will be described with reference to the flowchart illustrated in FIG. 43.

First, in Step S401, the information processing device detects an input of a playing command. Note that, the content playing command is executed, for example, according to user's input of a playing command on an initial display menu.

Next, in Step S402, the information processing device determines whether or not the 3D image flag [Index_multiview_video_flag] of the information file is 1.

The case where 3D image flag=1 indicates that 3D image is included in the content which are under the management of the information file. In this case, the process sequence proceeds to Step S411.

On the other hand, the case where 3D image flag=0 indicates that 3D image is not included in the content which are under the management of the information file. In this case, the process sequence proceeds to Step S403.

First, processes of Step S403 and the following steps will be described. In other words, the processes relates to the case where 3D image flag=0 and 3D image is not included in the content which are under the management of the information file.

In this case, in Step S403, a process of setting a plain configuration, that is, a playing process configuration within the playing apparatus (player) so as to perform a playing process on a 2D image and setting a video output as an output setting of a 2D image is performed.

Next, in Step S404, a title list is displayed on a display unit, and playing of a title (play list) is started in response to a user's input. Otherwise, automatic playing of a title is started. Note that, the displaying of the title list is performed by using data included in the information file. If a user designates a specific title in the title list, playing of the designated title is started. Note that, in the case where the content corresponding to the title which is regulated to be default in advance is set to be played irrespective of presence of the user's designation, the content is played.

Next, in Step S405, playing of the content designated by the user or the content which are regulated in advance is performed. In this case, since the 3D content is not included in the content which are under the management of the information file, the playing process for the 2D content is performed.

In Step S406, in the case where a play ending command is not detected, the processes of Step S404 the following steps are repeated, so that the content playing is continuously performed. In Step S406, in the case where the play ending command is detected, the process is ended.

Next, the processes of Step S411 and the following steps will be described. In other words, the processes relates to the case where 3D image flag=1 and 3D image is included in the content which are under the management of the information file.

In this case, in Step S411, a process of setting a plain configuration, that is, a playing process configuration within the playing apparatus (player) so as to perform a playing process on a 3D image and setting a video output as output setting of a 3D image is performed.

Next, in Step S412, a title list is displayed, and playing of a title (play list) is started in response of a user's input. Otherwise, automatic playing of a title is started. Note that, the displaying of the title list is performed by using data included in the information file. If a user designates a specific title in the title list, playing of the designated title is started. Note that, in the case where the content corresponding to the title which is regulated to be default in advance is set to be played irrespective of presence of the user's designation, the content is played.

Next, in Step S413, 3D image information set in the play list file corresponding to the title to be played is acquired. In other words, first, the following information described with reference to FIG. 11 and the like is acquired.

3D image flag [PlayList_multiview_video_flag]
3D image configuration information [PlayList_multiview_video_configuration]
Frame 0 image identification flag [PlayList_frame0_is_Left_flag]
Base image identification flag [PlayList_base_view_is_Left_flag]
Main path image identification flag [PlayList_MainPath_is_Left_flag]
Coding mode identification flag [PlayList_use_entropy_coding_mode_flag]
Inter-image reference identification flag [PlayList_use_inter-view_prediction_flag]

First, the playing apparatus refers to the 3D image flag [PlayList_multiview_video_flag] and the 3D image configuration information [PlayList_multiview_video_configuration].

The coding mode information described before with reference to FIG. 13 is recorded in the 3D image configuration information. The playing apparatus determines, first, based on the 3D image configuration information whether or not the coding data can be played by the current apparatus.

As described before with reference to FIG. 13, the information indicating which one of the following coding modes the 3D image as a recorded image is recorded in is set in the 3D image configuration information.

Value=3: Side-by-side method
Value=4: Top-and-bottom method
Value=5: Frame sequential method
Value=30: MVC coding 2-elementary stream/1-system stream (1-clip AV stream)
Value=31: MVC coding 2-elementary stream/2-system stream (2 clip AV stream)
Value=32: MVC coding 1-elementary stream/1-system stream (1-clip AV stream)
Value=40: independent 2-elementary stream/1-system stream (1-clip AV stream) (not MVC coding)
Value=41: independent 2-elementary stream/2-system stream (2 clip AV stream) (not MVC coding)

The playing apparatus determines based on the 3D image configuration information whether or not the coding data can be played by the current apparatus.

Note that, in the case of the setting of 3D image configuration information=30 to 32, it is determined whether or not the coding data can be played by the current apparatus with reference to the coding mode identification flag.

In other words, as described before with reference to FIG. 18, the coding mode identification flag is an identification flag indicating whether or not the coding process using the entropy coding mode is performed as a coding process.

More specifically, the coding process using the entropy coding mode is, for example, a coding process using CABAC (Context-based Adaptive Binary Arithmetic Coding).

More specifically, the coding process using no entropy coding mode is, for example, a coding process using CAVLC (Context-based Adaptive Variable Length Coding).

In addition, in the case of the setting of 3D image configuration information=30 to 32, the playing apparatus determines whether or not the coding data can be played by the current apparatus with reference to the coding mode identification flag.

In the case where it is determined that the coding data cannot be played by the current apparatus in Step S414, the process sequence proceeds to Step S415, so that the playing process for a 2D image is performed by using the 3D image. This process is an exceptional process, where, for example, a playing process using only the L images as playing data or the like is performed.

On the other hand, in the case where the coding data can be played by the current apparatus in Step S414, the process sequence proceeds to Step S416, so that a playing process for a 3D image is performed. Note that, in the playing process, the playing process is performed by referring to 3D image information set by a play list file and a clip information file and performing an optimal process corresponding to the reference information.

Note that, the 3D image information is set in units of a program sequence in the clip information file, and in the case where the switching of the program sequence is performed, the process of switching the referred 3D image information is also performed.

In Step S417, in the case where the play ending command is not detected, the processes of Step S412 and the following steps are repeated, so that the content playing is continuously performed. In Step S417, in the case where the play ending command is detected, the process is ended.

Note that, during the process of displaying the title list performed in Step S404 or Step S412, a process of displaying determination information, that is, the determination information as to whether or not a 3D image is likely to be included based on the 3D image identification flag included in the management information file such as an information file or a play list file on a display unit may be configured to be performed.

For example, with respect to the determination information as to whether or not a 3D image is likely to be included in the content stored in the entire recording medium, a process of displaying the determination information based on the 3D image identification flag in the information file may be available; and with respect to the determination information as to whether or not a 3D image is likely to be included in units of a title of the content recorded in the recording medium, a process of displaying the determination information based on the 3D image identification flag in the play list file may be available. A user can determine according to the display whether or not a 3D image exists in the entire medium or in units of a title.

[5. Example of Configuration of Information Processing Device]

Figure 44:
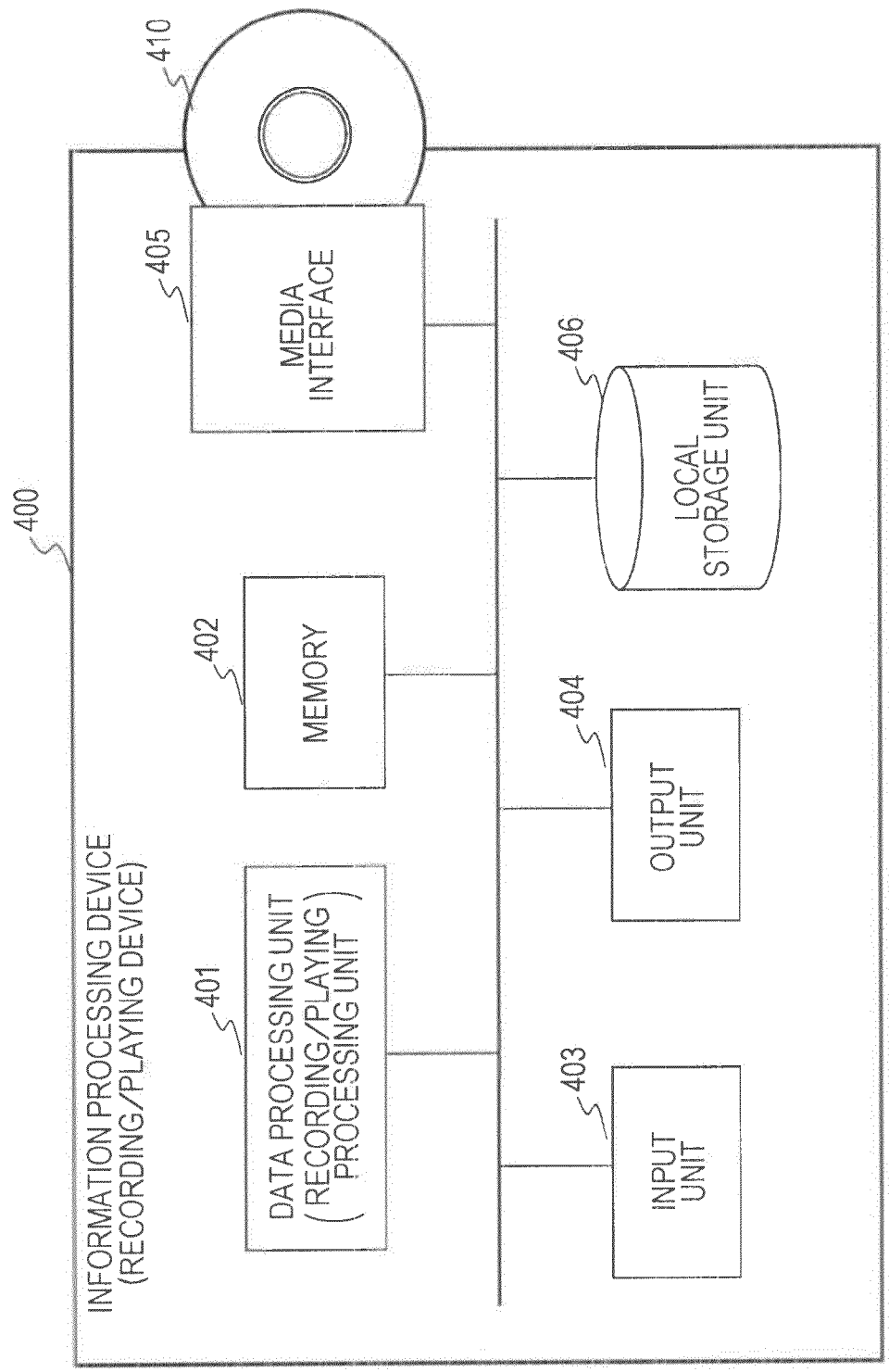
FIG. 44 is a diagram illustrating an example of a configuration of an information processing device according to an embodiment of the present invention.

Next, an example of a configuration of an information processing device performing the above-described recording/playing process will be described with reference to FIG. 44. FIG. 44 is a block diagram illustrating an example of a configuration of an information processing device 400 according to an embodiment of the present invention. The information processing device 400 is an apparatus which performs at least one process of data recording and data playing with respect to a medium 410. More specifically, the information processing device is, for example, a recording/playing apparatus, a player apparatus, a recorder apparatus, a video camera, a PC, or the like.

Note that, although a disc-type medium is illustrated as the medium 410 in FIG. 44, the medium is not limited to the disc-type medium, but a medium such as a flash memory may be used.

As illustrated in FIG. 44, the information processing device 400 includes a data processing unit (recording/playing processing unit) 401, a memory 402, an input unit 403, an output unit 404, a media interface 405, and a local storage unit 406.

The data processing unit 401 includes a CPU having a program execution function of executing various data processing programs. For example, an application program performing the data recording/playing process is executed. For examples, the processes according to the flowcharts illustrated in FIGS. 37 to 43 are performed.

The memory 402 is configured with a RAM, a ROM, or the like and is used as a storage area for application programs or the like executed by the data processing unit 401. In addition, the memory 402 is used as a work area for application parameters and is used as a buffer area or the like for medium-recorded data.

The input unit 403 is, for example, a user manipulation unit, through which an input of a data recording or playing command or various inputs can be made. Note that, the input unit 403 also includes a remote controller, so that remote controller manipulation information can be input. The output unit 404 is a video or audio output unit configured with a display, a speaker, or the like.

The media interface 405 is an interface applied for the data recording or playing process using the medium 410. According to the request from the data processing unit 401, the process of writing data in the medium 410 and the process of reading data from the medium 410 are performed.

The local storage unit 406 is configured with, for example, a hard disc or the like. For example, the local storage unit is used as a recording area for content and other various data or programs.

Hereinbefore, the present invention is described in detail with reference specific embodiments. However, it is obvious that modification and substitution of the embodiments can be made by the ordinarily skilled persons in the art without departing from the spirit of the present invention. In other words, since the present invention is disclosed in exemplary forms, it should not be construed as limitative. The spirit of the present invention should be determined by referring to the claims.

In addition, a series of processes described in the specification can be performed in a hardware configuration, a software configuration, or a combinational configuration thereof. In the case where the processes are performed in a software configuration, a program where a process sequence is recorded may be installed in a memory of a computer assembled with a dedicated hardware configuration so as to be performed, or the program may be installed in a general-purpose computer, which can execute various processes, to be performed. For example, programs may be recorded in a recording medium in advance. Besides installation from a recording medium to a computer, the program may be received via a network such as LAN (Local Area Network) or the Internet and be installed in a built-in recording medium such as a hard disk.

Note that, various processes disclosed in the specification may be performed in a time series manner, and according to processing capability of a processing apparatus or if necessary, the processes may be performed in parallel or individually. In addition, in the specification, a system is a logical collective configuration of a plurality of apparatuses, and the constituent apparatuses are not limited so as to be contained in the same casing.

INDUSTRIAL APPLICABILITY

As described hereinbefore, according to an embodiment of the present invention, it is possible to implement a data recording/playing configuration capable of easily acquiring attribute information on a frame constituting a 3D image recorded on a recording medium. The attribute information of the 3D image is recorded in each of hierarchized management information files as an attribute in units of management data of each of the management information files. In the case where a coding method is a frame sequential method, frame identification data indicating whether each frame is a left-eye image (L image) or a right-eye image (R image) are recorded; and in the case where the coding method is an inter-view reference coding method where any one of L and R images is referred to during decoding, base image identification data indicating which one of the L and R images is a base image are recorded. According to the configuration, a playing apparatus can determine an attribute of a frame without performing analysis of data to be played.

REFERENCE SIGNS LIST

101 UI information [UIAppInfoBDAV( )]
102 Play list information [TableOfPlayLists( )]
103 Maker private data area [MakersPrivateData( )]
111 Maker ID [maker_ID] recording area
112 Maker model code [maker_model_code] recording area
113 Data block [data_block] recording area
115 Flag information [Index_multiview_video_flag]

121 3D image flag [PlayList_multiview_video_flag]
122 3D image configuration information [PlayList_multiview_video_configuration]
123 Frame 0 image identification flag [PlayList_frame0_is_Left_flag]
124 Base image identification flag [PlayList_base_view_is_Left_flag]
125 Main path image identification flag [PlayList_MainPath_is_Left_flag]
126 Coding mode identification flag [PlayList_use_entropy_coding_mode_flag]
127 Inter-image reference identification flag [PlayList_use_inter-view_prediction_flag]
130 Play list
131 Main path (main play item)
132 Sub path (sub play item)
135 Clip-a
136 Clip-b
141 Main path (play item) information recording area
142 Sub path (sub play item) information recording area
145 Sub path (sub play item) type information recording area
201 ClipInfo
202 SequenceInfo
203 ProgramInfo
204 CPI
205 ClipMark
206 MakersPrivateData
210 EP map
220 Number of program sequences (number_of_program_sequences)
221 3D image flag [ClipInfo_multiview_video_flag]
222 3D image configuration information [ClipInfo_multiview_video_configuration]
223 Frame 0 image identification flag [ClipInfo_frame0_is_Left_flag]
224 Base image identification flag [ClipInfo_base_view_is_Left_flag]
225 Clip-adaptive image identification flag [ClipInfo_this_Clip_is_Left_flag]
226 Coding mode identification flag [ClipInfo_use_entropy_coding_mode_flag]
227 Inter-image reference identification flag [ClipInfo_use_inter-view_prediction_flag]
400 Information processing device
401 Data processing unit (recording/playing processing unit)
402 Memory
403 Input unit
404 Output unit
405 Media interface
406 Local storage unit
410 Medium

The invention claimed is:

1. An information processing device comprising:
a data processing unit operable to perform a data recording process on a recording medium,
wherein, during the data recording process, the data processing unit records attribute information of a 3-dimensional (3D) image included in recorded data in each of hierarchized management information files,
wherein the attribute information comprises data that indicates whether a main path in a play list of the 3D image corresponds to one of a left-eye or a right-eye image.

2. The information processing device according to claim 1, wherein, when a coding method of the 3D image is a frame sequential method, the attribute information comprises:
a frame identification flag, wherein a value of the frame identification flag indicates whether a first frame constituting the 3D image is a left-eye image (L image) or a right-eye image (R image).

3. The information processing device according to claim 1, wherein, when a coding method of the 3D image is an inter-view reference coding method, the attribute information comprises:
a base image identification flag, wherein a value of the base image identification flag indicates whether a left-eye image or a right-eye image is set as a base image which is a reference image during decoding.

4. The information processing device according to claim 1, wherein the data processing unit is operable to record 3D image configuration information indicating a method of coding the 3D image as the attribute information in the management information files.

5. The information processing device according to claim 1, wherein the data processing unit records the attribute information in units of management data of each of the management information files and wherein each of the management information files comprise:
a clip information file corresponding to a stream file storing image data; and
a play list file comprising playing section designation information with respect to the clip information file.

6. An information processing device comprising:
a data processing unit operable to:
perform a data playing process on a recording medium,
wherein, during the data playing process, the data processing unit sequentially reads attribute information of a coded 3-dimensional (3D) image recorded on the recording medium from each of hierarchized management information files,
wherein the attribute information comprises data indicating whether a main path in a play list of the 3D image corresponds to one of a left-eye or a right-eye image; and
acquire the attribute information and perform a decoding process according to the acquired attribute information.

7. The information processing device according to claim 6, wherein, when a coding method of the 3D image is a frame sequential method, the attribute information comprises:
a frame identification flag, wherein a value of the frame identification flag indicates whether a first frame constituting the 3D image is a left-eye image (L image) or a right-eye image (R image), and
wherein the data processing unit reads the frame identification flag and performs a decoding process where the left-eye image (L image) and the right-eye image (R image) are correctly determined according to the read frame identification flag.

8. The information processing device according to claim 6, wherein, when a coding method of the 3D image is an inter-view reference coding method, the attribute information comprises:
a base image identification flag, wherein a value of the base image identification flag indicates whether a left-eye image (L image) or a right-eye image (R image) is set as a base image which is a reference image during decoding, and
wherein the data processing unit reads the base image identification flag and performs a decoding process where the base view is correctly determined according to the read base image identification flag.

9. The information processing device according to claim 6, wherein the attribute information comprises:

3D image configuration information indicating a method of coding the 3D image wherein the data processing unit determines a method of coding the 3D image recorded in the recording medium based on the 3D image configuration information.

10. The information processing device according to claim 6, wherein the attribute information recorded in each of the management information files comprises:

a clip information file corresponding to a stream file storing image data; and a play list file comprising playing section designation information with respect to the clip information file, and wherein the data processing unit reads the attribute information in units of management data from a management information file selected according to data to be played in an order of the play list file and the clip information file.

11. A non-transitory computer-readable storage medium having stored thereon, a computer program having at least one code section, the at least one code section being executable by a computer for causing the computer to perform steps comprising:

performing a data playing process on recorded data from a recording medium, wherein during the data playing process, attribute information for a 3-dimensional (3D) image recorded on the recording medium is acquired from each of hierarchized management information files, wherein the attribute information comprises data indicating whether a main path in a play list of the 3D image corresponds to one of a left-eye or a right-eye image, and wherein a playing apparatus for playing the recorded data analyzes the attribute information in units of management data by sequentially referring to the attribute information according to a hierarchy of the management information files.

12. The non-transitory computer-readable storage medium according to claim 11, wherein, when a coding method of the 3D image is a frame sequential method, the attribute information comprises:

a frame identification flag, wherein a value of the frame identification flag indicates whether a first frame constituting the 3D image is a left-eye image (L image) or a right-eye image (R image), and wherein the playing apparatus reads the frame identification flag and performs a decoding process where the left-eye image and the right-eye image are correctly determined according to the read frame identification flag.

13. The non-transitory computer-readable storage medium according to claim 11, wherein, when a coding method of the 3D image is an inter-view reference coding method, the attribute information comprises:

a base image identification flag, wherein a value of the base image identification flag indicates whether a left-eye image or a right-eye image is set as a base image which is a reference image during decoding, and wherein the playing apparatus reads the base image identification flag to perform a decoding process where the base view is correctly determined according to the read base image identification flag.

14. The non-transitory computer-readable storage medium according to claim 11, wherein the attribute information comprises:

3D image configuration information indicating a method of coding the 3D image, and wherein the playing apparatus determines the method of coding the 3D image recorded on the recording medium based on the 3D image configuration information.

15. The non-transitory computer-readable storage medium according to claim 11, wherein the attribute information recorded in each of the management information files comprises:

a clip information file corresponding to a stream file storing image data; and a play list file comprising playing section designation information with respect to the clip information file, and wherein the playing apparatus reads the attribute information according to data to be played in an order of the play list file and the clip information file and analyzes the attribute information for playing the recoded data.

16. An information processing method, comprising:

in an information processing device performing a data recording process on a recording medium:

recording attribute information of a 3-dimensional (3D) image on the recording medium during the data recording process, wherein the attribute information comprises data indicating whether a main path in a play list of the 3D image corresponds to one of a left-eye image or a right-eye image, wherein the attribute information is recorded in each of hierarchized management information files in units of management data of each of the management information files.

17. An information processing method, comprising:

in an information processing device performing a data playing process from a recording medium:

sequentially reading attribute information of a coded 3-dimensional (3D) image recorded on the recording medium from each of hierarchized management information files;

wherein the attribute information comprises data indicating whether a main path in a play list of the 3D image corresponds to one of a left-eye image or a right-eye image, acquiring the attribute information of the 3D image; and performing a decoding process according to the acquired attribute information.

18. A non-transitory computer-readable storage medium having stored thereon, a computer program having at least one code section, the at least one code section being executable by a computer for causing the computer to perform steps comprising:

performing, a data recording process on a recording medium, the data recording process comprising:

recording attribute information of a 3-dimensional (3D) image included in the recorded data in each of hierarchized management information files in units of management data;

wherein the recorded attribute information comprises data indicating whether a main path in a play list of the 3D image corresponds to one of a left-eye image or a right-eye image, and wherein attribute information on a frame constituting the 3D image is included in the recorded attribute information.

19. A non-transitory computer-readable storage medium having stored thereon, a computer program having at least one code section, the at least one code section being executable by a computer for causing the computer to perform steps comprising:

sequentially reading attribute information of a coded 3-dimensional (3D) image recorded on a recording medium from each of hierarchized management information files, wherein the attribute information comprises data indicating whether a main path in a play list of the 3D image corresponds to one of a left-eye image or a right-eye image;

acquiring attribute information on a frame constituting the 3D image in units of management data of each of the management information files, and decoding the 3D image based on the acquired attribute information.

20. The information processing device according to claim 1, wherein the attribute information comprises a flag that indicates whether the main play item in the play list of the 3D image corresponds to the left-eye or the right-eye image, and wherein a value of the flag is based on a coding method used for recording the 3D image.

* * * * *